(12) United States Patent
Wernberg et al.

(10) Patent No.: US 12,523,097 B2
(45) Date of Patent: Jan. 13, 2026

(54) LADDER STORAGE DEVICES

(71) Applicant: Tricam Industries, Inc., Eden Prairie, MN (US)

(72) Inventors: Benjamin M. Wernberg, Savage, MN (US); Jackson T. Wilkey, Minneapolis, MN (US); Joseph P. Foley, Mendota Heights, MN (US); Ryan P. Ellsworth, Chanhassen, MN (US); Benjamin P. Williams, Chaska, MN (US)

( * ) Notice: Subject to any disclaimer, the term of this patent is extended or adjusted under 35 U.S.C. 154(b) by 0 days.

(21) Appl. No.: 18/500,954

(22) Filed: Nov. 2, 2023

(65) Prior Publication Data

US 2024/0151108 A1    May 9, 2024

Related U.S. Application Data

(60) Provisional application No. 63/382,174, filed on Nov. 3, 2022.

(51) Int. Cl.
*E06C 7/14* (2006.01)
*E06C 1/22* (2006.01)

(52) U.S. Cl.
CPC . *E06C 7/14* (2013.01); *E06C 1/22* (2013.01)

(58) Field of Classification Search
CPC .............. E06C 7/14; E06C 1/22; E06C 7/50
USPC .... 248/211, 213, 213.1, 304, 305, 306, 339, 248/340, 341, 690, 691, 692
See application file for complete search history.

(56) References Cited

U.S. PATENT DOCUMENTS

| | | | | |
|---|---|---|---|---|
| 1,651,914 A * | 12/1927 | Bertrand | ............... | E06C 7/08 182/177 |
| 3,353,778 A * | 11/1967 | Sylvain | ............... | E06C 7/14 248/246 |
| 4,025,016 A * | 5/1977 | Brothers | ............... | E06C 7/14 248/210 |
| 5,967,476 A * | 10/1999 | Chen | ............... | F16B 45/00 248/304 |
| 6,250,481 B1 * | 6/2001 | Chang | ............... | A47K 10/10 248/303 |
| 6,250,597 B1 * | 6/2001 | Kuo | ............... | A47K 10/10 248/231.91 |
| 8,245,367 B2 * | 8/2012 | Kato | ............... | F16B 19/1081 24/456 |
| 8,313,273 B2 * | 11/2012 | Chu | ............... | F16B 45/008 248/231.9 |
| 8,662,463 B2 * | 3/2014 | Chen | ............... | F16B 47/00 248/339 |
| 8,757,570 B2 * | 6/2014 | Ernst | ............... | A47G 25/0607 248/223.41 |
| 8,820,543 B2 * | 9/2014 | Huang | ............... | F16B 45/00 248/230.4 |
| 9,494,184 B1 * | 11/2016 | Lee | ............... | F16B 47/00 |
| 10,280,957 B2 * | 5/2019 | Mutch | ............... | A47K 3/281 |
| 2007/0090252 A1 * | 4/2007 | Chou | ............... | A47G 25/065 248/304 |

(Continued)

FOREIGN PATENT DOCUMENTS

DE    29703258 U1 *  4/1997  ............... A47G 1/20
GB    2167483 A  *  5/1986  ............... A47G 1/20

*Primary Examiner* — Kimberly T Wood

(57) ABSTRACT

Various devices and methods for hanging tools or other items from a ladder are disclosed. The devices may be incorporated into parts of the ladder itself or be separate add-on devices for use with assorted ladders. The devices include a hinge button hook, a hinge button, a foot hook, and a rail hook.

5 Claims, 45 Drawing Sheets

(56) References Cited

U.S. PATENT DOCUMENTS

| | | | | |
|---|---|---|---|---|
| 2012/0001042 A1* | 1/2012 | Zhong | ................ | G09F 7/12 |
| | | | | 248/222.14 |
| 2012/0286113 A1* | 11/2012 | Chen | ................ | F16B 47/00 |
| | | | | 248/206.2 |
| 2014/0097217 A1* | 4/2014 | Walsh | ................ | A45F 5/02 |
| | | | | 224/268 |
| 2014/0326844 A1* | 11/2014 | Sullivan | ............ | F16B 45/034 |
| | | | | 248/339 |
| 2016/0002976 A1* | 1/2016 | Saucier | ............ | E06C 7/143 |
| | | | | 248/210 |
| 2022/0078536 A1* | 3/2022 | Tseng | .............. | H04R 1/105 |

\* cited by examiner

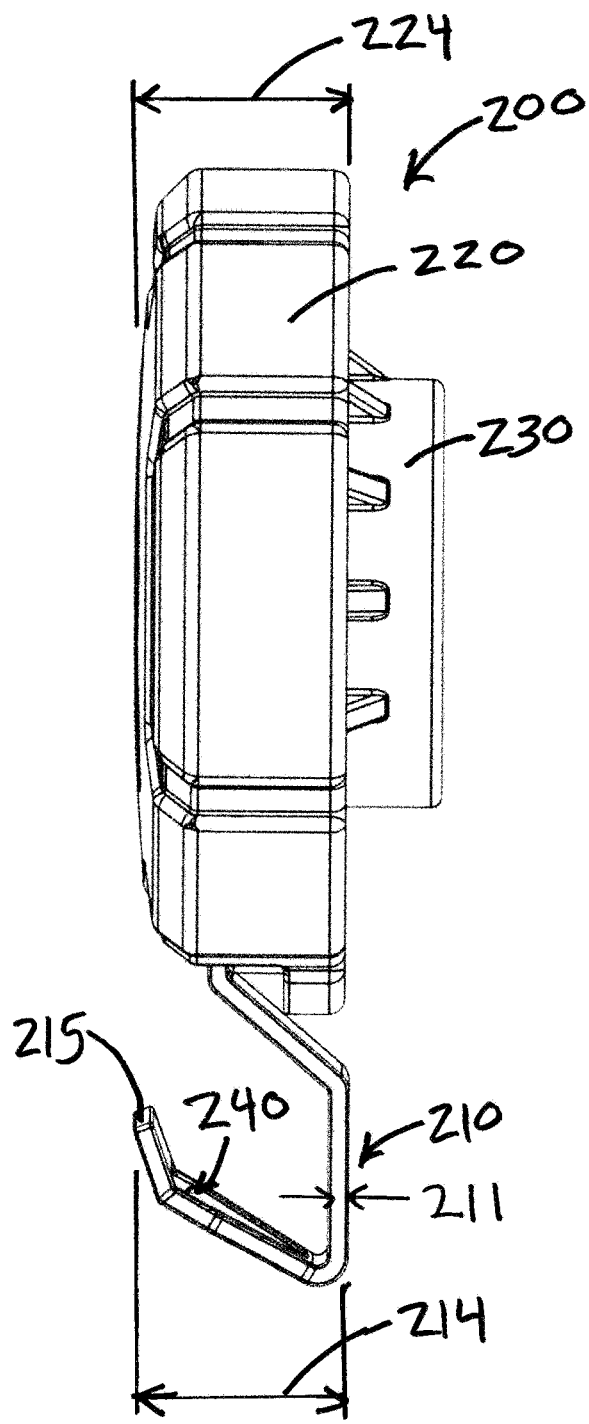 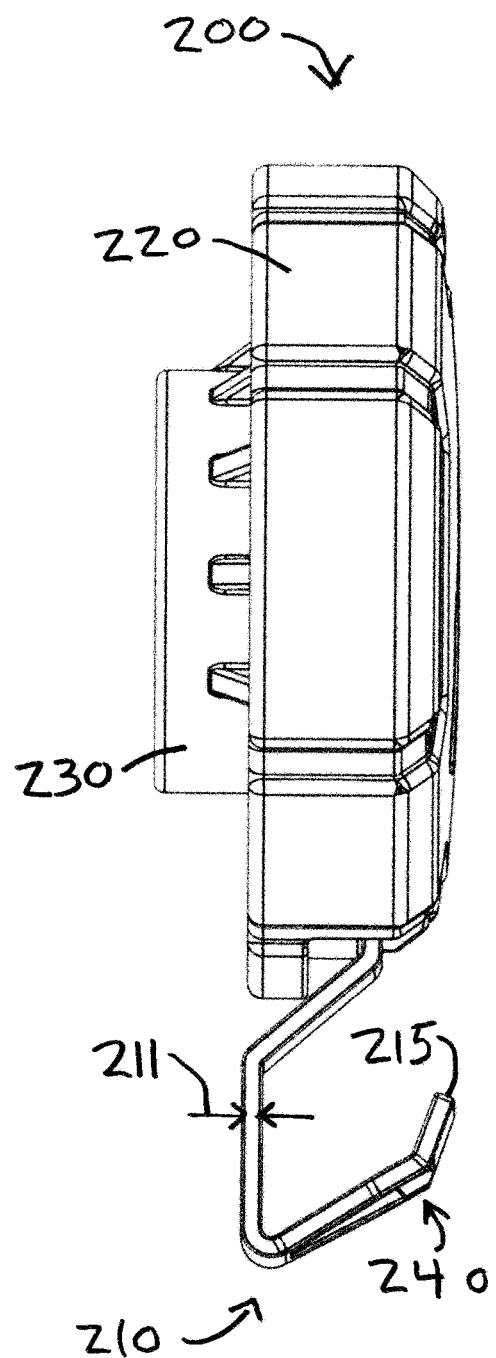
FIG. 10      FIG. 11

A - A

LADDER STORAGE DEVICES

RELATED APPLICATION

The present application claims the benefit of U.S. Provisional Application No. 63/382,174, filed Nov. 3, 2022, which is hereby incorporated herein in its entirety by reference.

FIELD OF THE INVENTION

The present invention relates to devices for hanging, storing, holding tools, hardware, and other various equipment on a ladder.

BACKGROUND OF THE INVENTION

When working on a ladder, it is often desirable to have tools, paint and other necessary objects within easy reach. For example, it is known to removably attach a paint roller tray to the rung of a ladder to paint a ceiling or other area requiring a ladder or step stool more easily. Golden, U.S. Pat. No. 3,625,388, discloses a paint tray particularly useful with an upright ladder.

Utility trays for use with stepladders are also known in the art. Pham, U.S. Pat. No. 5,673,885, discloses a paint tray for a stepladder for storing work materials, tools and a paint bucket that is held onto the ladder by retaining means. Melanson, U.S. Pat. No. 5,613,574, discloses a ladder mounted tool holster and parts tray that removably clamps onto the top step of a stepladder. Katz et. al, U.S. Pat. No. 6,443,260, discloses a stepladder tray pivotally attached to the top cap of a stepladder for supporting tools and the like. Christ et. al, U.S. Pat. No. 5,052,581, discloses a detachable ladder support tray for supporting tools and paint containers.

It is often inconvenient, however, to use a removable tool holder or tray with a ladder. In some instances, the tool holder or tr may be difficult to attach or remove from the ladder. The removable tool holder or tray and ladder usually must be stored separately, taking up additional space. Additionally, to move a ladder from place to place, the tool holder or tray may need to be removed and carried separately because of weight or awkward transport configuration.

Ladder trays and buckets are known, including those disclosed in U.S. Pat. No. 3,625,388 to Golden; U.S. Pat. No. 5,052,581 to Christ et al.; U.S. Pat. No. 5,613,574 to Melanson; U.S. Pat. No. 5,673,885 to Pham; U.S. Pat. No. 6,443,260 to Katz et al.; U.S. patent application Ser. No. 14/207,887 to Najey (Published as U.S. Pub. No. US20140326538A1); U.S. Pat. No. 9,714,542 to Harcz; U.S. Pat. No. 7,886,872 to Astor et al.; U.S. Pat. No. 8,453,796 to Astor et al.; U.S. Pat. No. 7,128,187 to Simpson; U.S. Pat. No. 7,188,706 to Simpson; U.S. Pat. No. 10,138,680 to Williams et al.; U.S. Pat. No. D833,643 to Foley et al; as well as U.S. patent application Ser. No. 16/654,699 to Foley et al. (patented as U.S. Pat. No. 11,505, 994); U.S. patent application Ser. No. 16/715,097 to Foley (patented as U.S. Pat. No. 11,655,676); U.S. patent application Ser. No. 16/788,655 to Wernberg, et al. (published as U.S. Pub. No. US20210246725 A1), and U.S. patent application Ser. No. 17/130,414 to Foley et al. (published as U.S. Pub. No. US20220195800 A1), all of which are incorporated herein by reference.

There is a need in the industry to have storage mechanisms that are built into the ladder itself or are easily used on a ladder that do not interfere with operation of the ladder to hold tools, hardware and equipment while not increasing the size or weight of the ladder itself or negligibly adding to the weight of the ladder.

SUMMARY OF THE INVENTION

The ladder storage devices of the present invention provide various means to hang a tool, hardware, or other item from advantageous positions on ladders. These devices are especially useful with multi-position ladders by incorporating the devices into existing parts for those ladders.

One embodiment of the present invention is a hook that extends from a hinge button of a multi-position ladder as depicted in FIGS. 7-15. Preferably the hook does not increase the size of the button itself and does not increase the profile of the button (i.e., the hook does not extend wider from the ladder than the button itself). The hook has an upward tail for hanging items that have straps or handles (e.g., pails).

The hook may also have built into it a slot for items that have hooks themselves. For example, the slot is designed to accommodate belt hooks for power tools such as the belt hook (340 in FIG. 3) disclosed in U.S. Patent Pub. No. US20210183188A1 owned by Milwaukee Electric Tool Corp., which is incorporated herein by reference. These types of belt hooks are designed with a low profile to prevent interference while using the tools or catching on other tools, supplies, equipment when moving the tools. In many cases of hand-held power tools, these hooks are actually located on the battery packs used to power the tools.

While the button and hook can be made of a single unibody construction, it is preferable that the button and hook are individual parts to allow differing materials of manufacture to address the different weight and strength requirements of the parts. The hook itself is preferably metal for durability and strength for cyclical hanging/removing items from the hook and for weight bearing. However, the button or hook can be made of any suitable materials known in the art.

As best seen in FIG. 15, the preferred embodiment of the button hook includes an outer cap, a base, and the hook. The button cap preferably has a slot that allows the hook to traverse the cap body and attach to the metal axle of the hinge lock for strength and stability of the hook itself. The preferred embodiment of the hook has an opening at its top to connect to the axle as well as an opening to accept a protrusion on the base to prevent the hook from rotating separately from the button. Another novel aspect of the hook is that it does not extend beyond the outer face of the button cap to prevent unintentional catching on the hook while either moving items around the ladder or moving the ladder itself. Further, the hook does not extend or beyond the inner face of the button cap so that the hook does not interfere with operation of the ladder (e.g., adjusting the angles or extending the rails on a multi-position ladder).

Another embodiment of the invention depicted in FIGS. 16-24 includes a hinge button with slots built into it that will allow tools, hardware, or other items with hooks or clips to be stored on or hang from the button. The preferred embodiment comprises two pieces, a front and a back of a hinge button mechanism. Two pieces allow for easier manufacturing and installation of the button on a ladder. However, a single piece device is also contemplated as within the scope of the invention. The two pieces are molded to provide slots that traverse the button from top to bottom and left to right. The front piece is manufactured with prongs that insert into prong receivers on the back piece and have lips on the ends to secure the prongs in place. This also allows for the front piece to be easily replaced if it breaks or for aesthetic reasons.

As with the earlier-described embodiment, the slots are preferably sized to accept not only ordinary hand tools such as screwdrivers, but ideally are configured to accept belt hooks for power tools and on power tool battery packs.

Another embodiment of the ladder storage device depicted in FIGS. 25-44 includes a rail hook that is built into the feet of a ladder that provides a location to store or hang tools, hardware, materials when a ladder is in the extension position. Molded feet for ladders are well known. For example, U.S. Pat. No. 11,131,142 assigned to Werner Co. (incorporated herein by reference) depicts a plastic foot that is molded to accept the profile of a ladder rail end. The present invention includes a slot in the foot that accepts tools, hardware, or other items. The preferred embodiment contemplates a foot shaped with an indent in the middle running in the same direction as the rail onto which the foot is attached with a cross member over the indent. This arrangement provides a slot for placing items or a location to hang items that have hooks or clips. Ideally the slot is sized to accept common belt hooks for power tools and on power tool battery packs.

The preferred embodiment of the rail hook is a unibody structure that includes both the foot of the ladder as well as the hook. However, it is within the scope of the invention to have the foot and hook be separate pieces that are attached together either prior to installation on the ladder rail or independently attached to the rail. Preferably the profile of the hook does not extend outward from the rail beyond the lowest extremity of the foot when in any use orientation to prevent unintentional catching on the hook while either moving items around the ladder or moving the ladder itself.

A further embodiment contemplates a ladder side hook as depicted in FIGS. 45-54 that attaches to the rails of a ladder to provide another alternative for storage or hanging of tools, hardware, or other items with hooks or clips on a ladder. This embodiment is preferably a removable hook that snaps onto the rail of a ladder. This embodiment may also include a locking device to maintain the device where it is installed on the ladder, so it is not inadvertently moved while using or moving the ladder. However, the invention also contemplated the ladder side hook being permanently mounted to a ladder rail.

The preferred embodiment of the ladder side hook includes prongs sized for and oriented to wrap around the ladder rail and snap into place with lips on the prongs latching onto the inner face of the rail. The preferred embodiment further includes one or more locks to prevent the ladder side hook from inadvertently being knocked off or moving on the rail. The preferred embodiment utilizes the same type of prongs with lips as the side hook itself to tightly lock the device to the ladder rail. The upper set of prongs preferably are placed above a rung of the ladder and the lower set of prongs preferably are placed below the same rung to keep the ladder side hook in its location.

Both the side hook and lock are preferably made of an appropriate plastic strong enough to support tools or other items to be hung from the hook while having durability of the prongs to be installed and removed from a ladder numerous times with breaking or weakening. However, the ladder side hook and lock can be made of any appropriate material known in the art. It is also recommended that the side hook and lock be of contrasting colors to more easily see whether the device is locked in place. Additionally, the prongs only contact the out rail to allow the inner rail to slide for extension and contraction of the ladder.

Another novel feature of the ladder side hook embodiment is the angles of the slot of the hook differ depending on which side of the hook is facing up. As best seen in FIGS. 55-56, this design allows the top to be parallel with the surface upon with the ladder is resting in two different orientations (A-frame or extension). For instance, a multi-position ladder in the A-frame orientation will have a different rail angle than a multi-position ladder in extension orientation leading against a building or object, but this design allows the slot to be parallel to the surface upon which the ladder rests to better hold tools, hardware, or other items. It can also be seen in FIGS. 55-56 that the hook of the hinge button hook embodiment allows the hook portion to be at the bottom of the hinge button to best hold tools, hardware, or other items.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 10 depicts a right-side view of the hinge button hook of FIG. 7.

FIG. 11 depicts a left-side view of the hinge button hook of FIG. 7.

Figure 1:
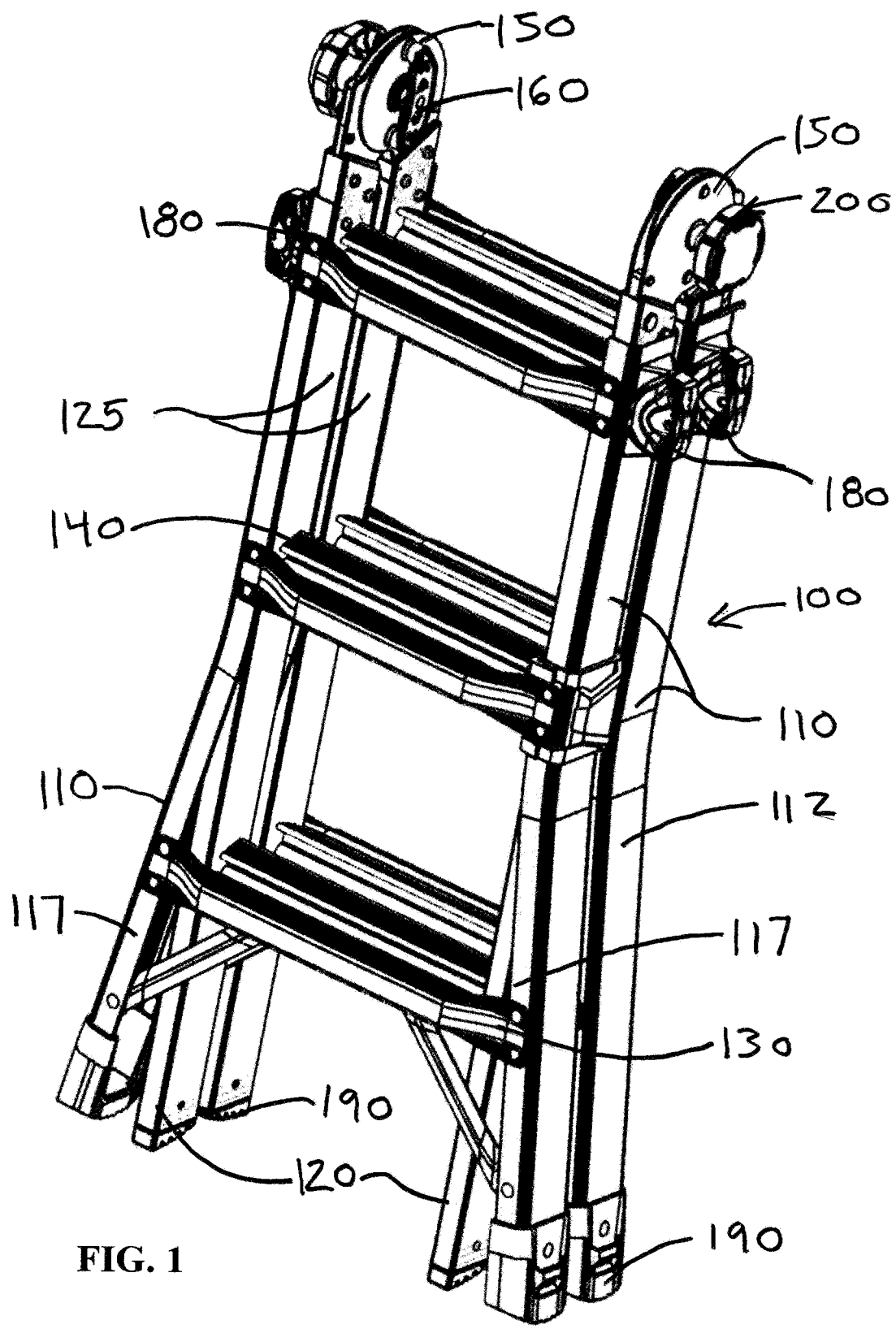
FIG. 1 depicts a perspective view of a multi-position ladder in a closed or stored position having embodiments of ladder storage devices.
Figure 2:
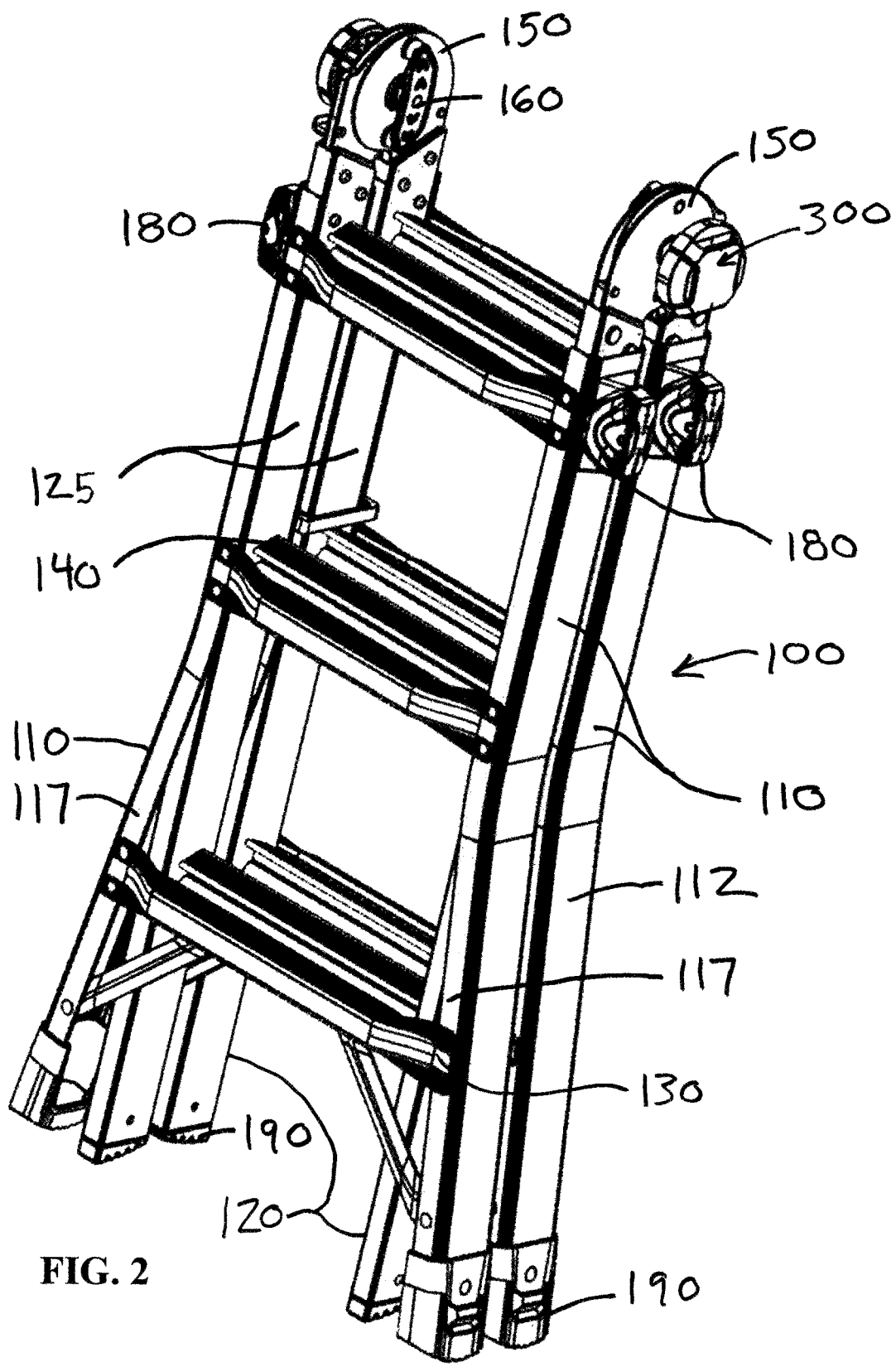
FIG. 2 depicts a second perspective view of the multi-position ladder of FIG. 1.
Figure 3:
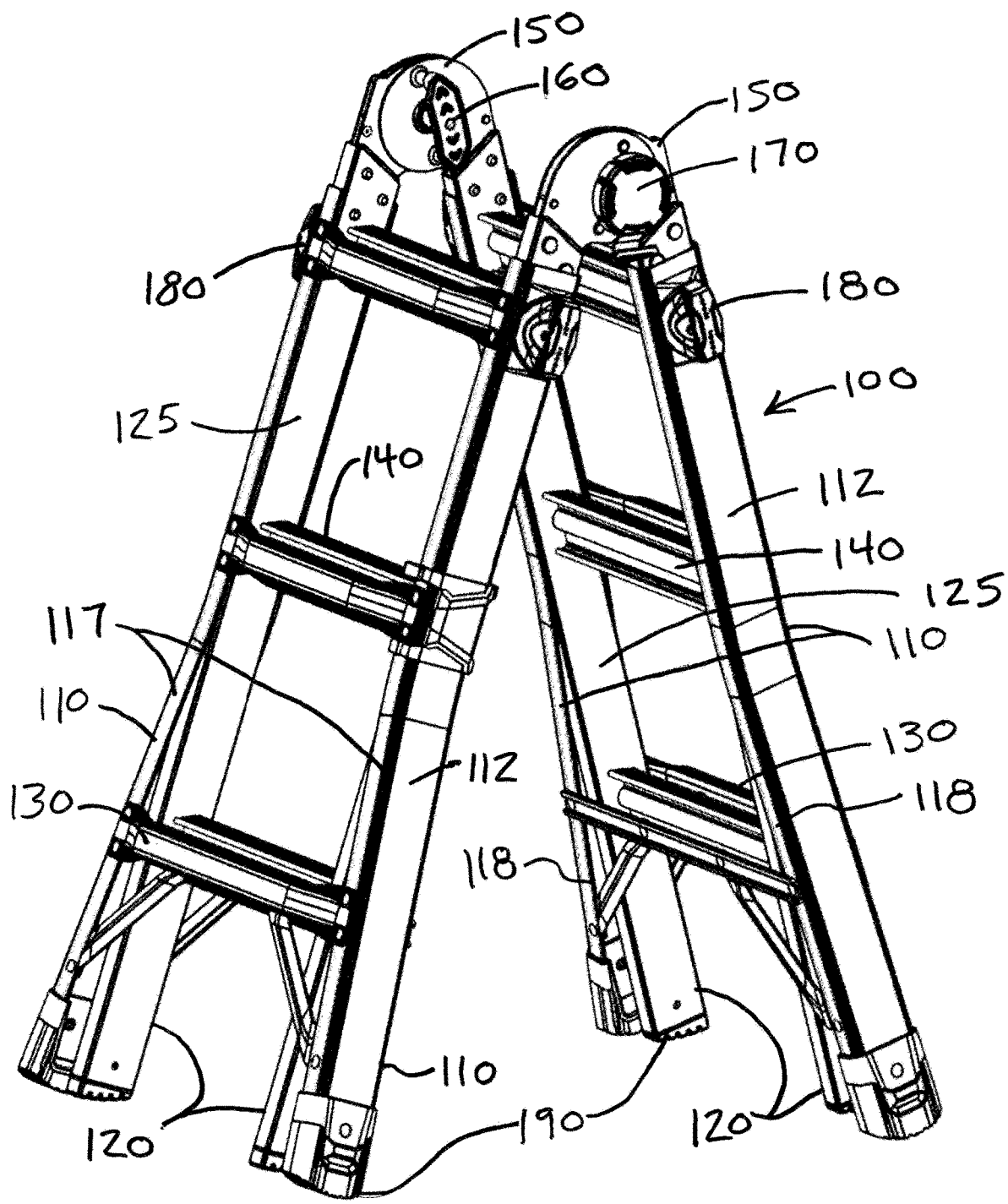
FIG. 3 depicts a perspective view of a multi-position ladder in an open/A-frame position having embodiments of ladder storage devices.
Figure 4:
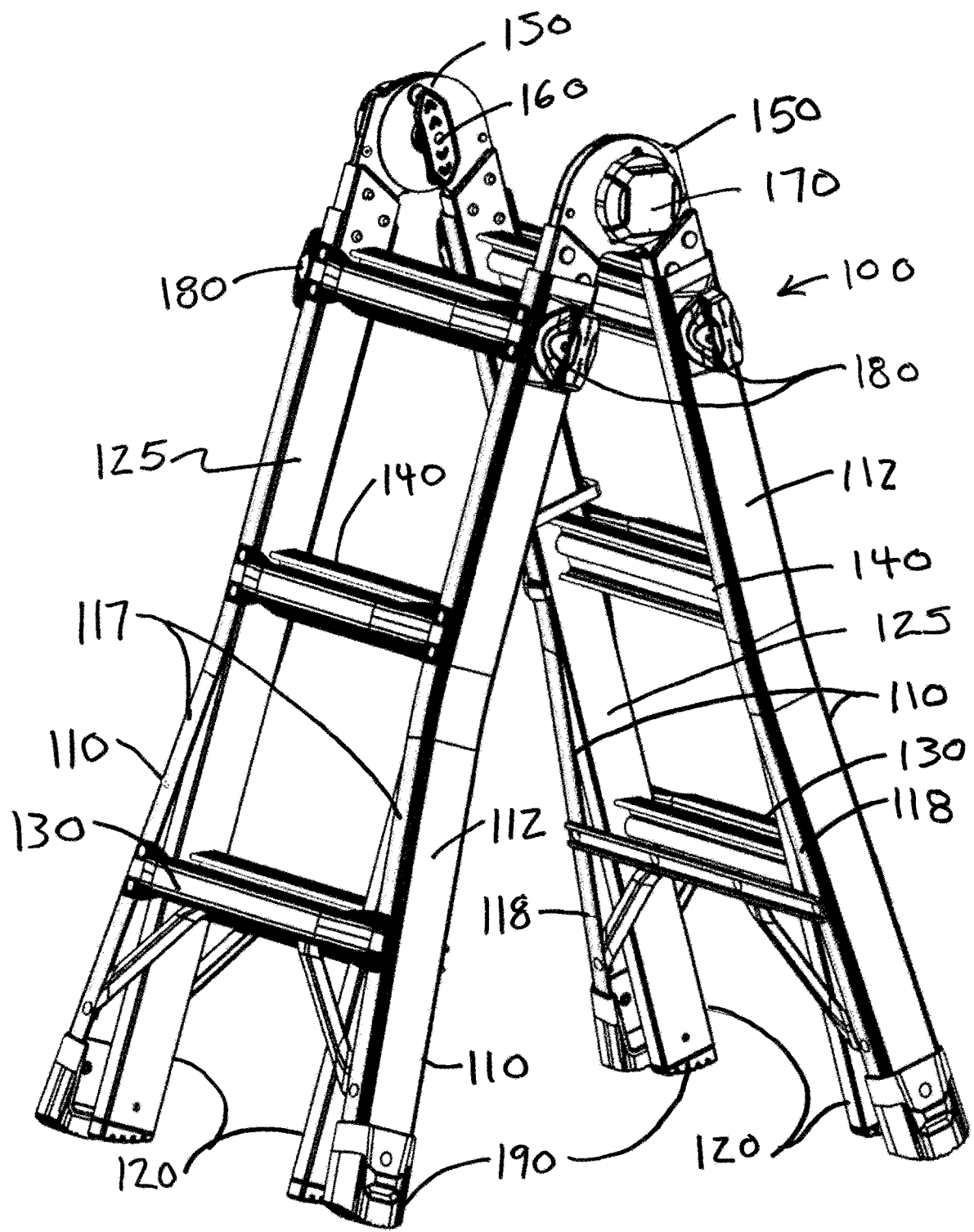
FIG. 4 depicts a second perspective view of the multi-position ladder of FIG. 3
Figure 5:
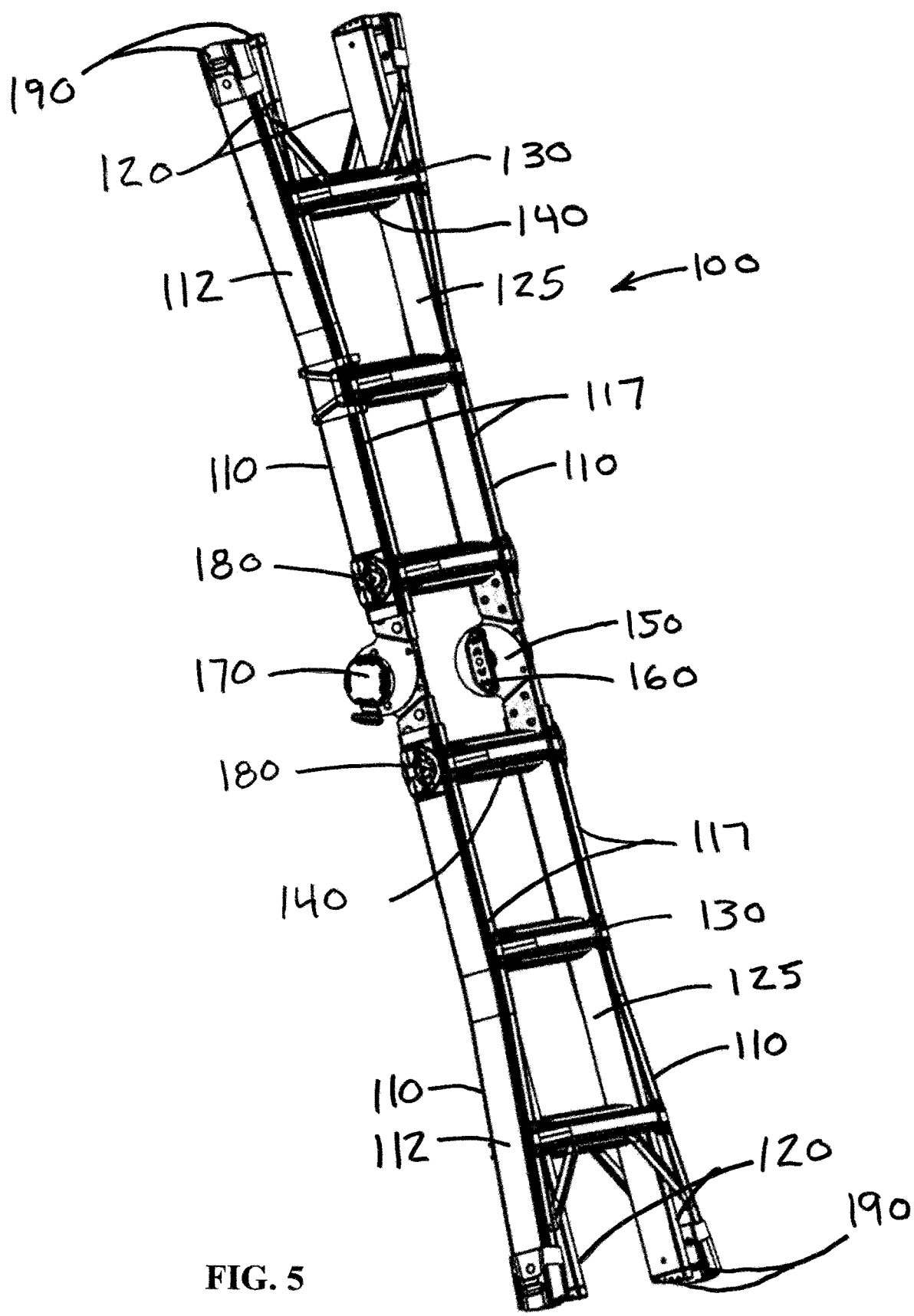
FIG. 5 depicts a perspective view of a multi-position ladder in an extension position having embodiments of ladder storage devices
Figure 6:
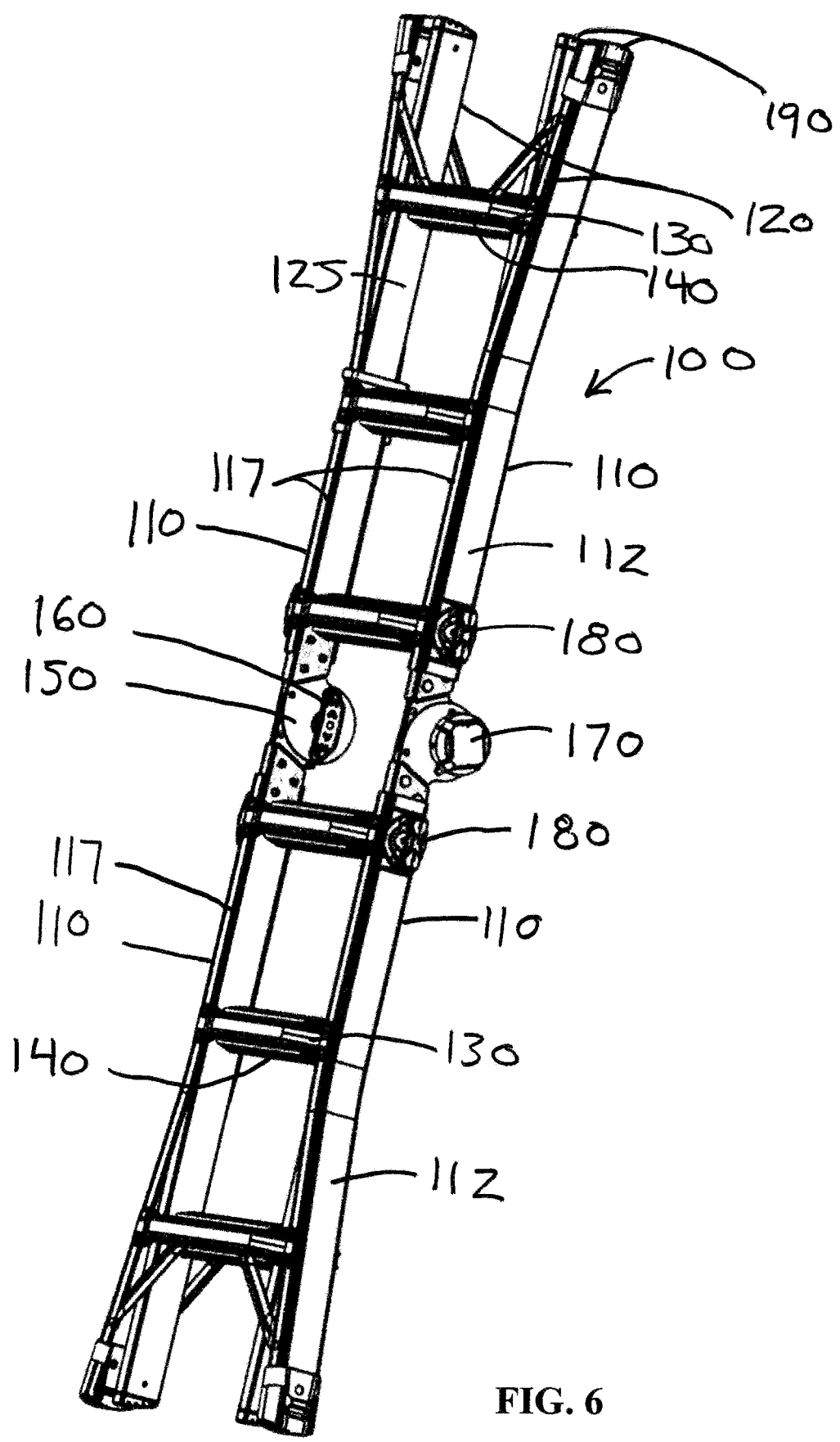
FIG. 6 depicts a second perspective view of the multi-position ladder of FIG. 5.
Figure 7:
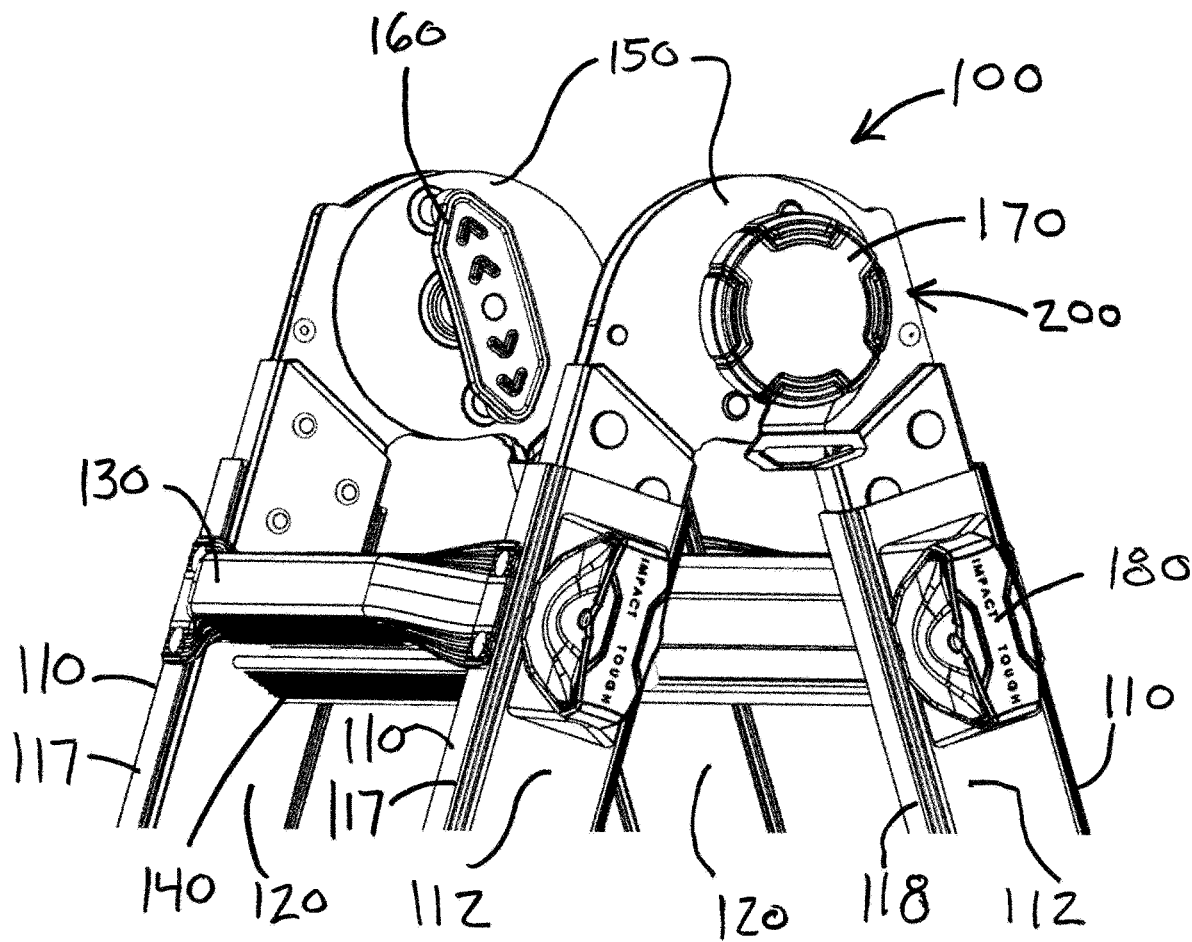
FIG. 7 depicts a close-up perspective view of the multi-position ladder of FIG. 3 providing more detail of a hinge button hook embodiment.
Figure 8:
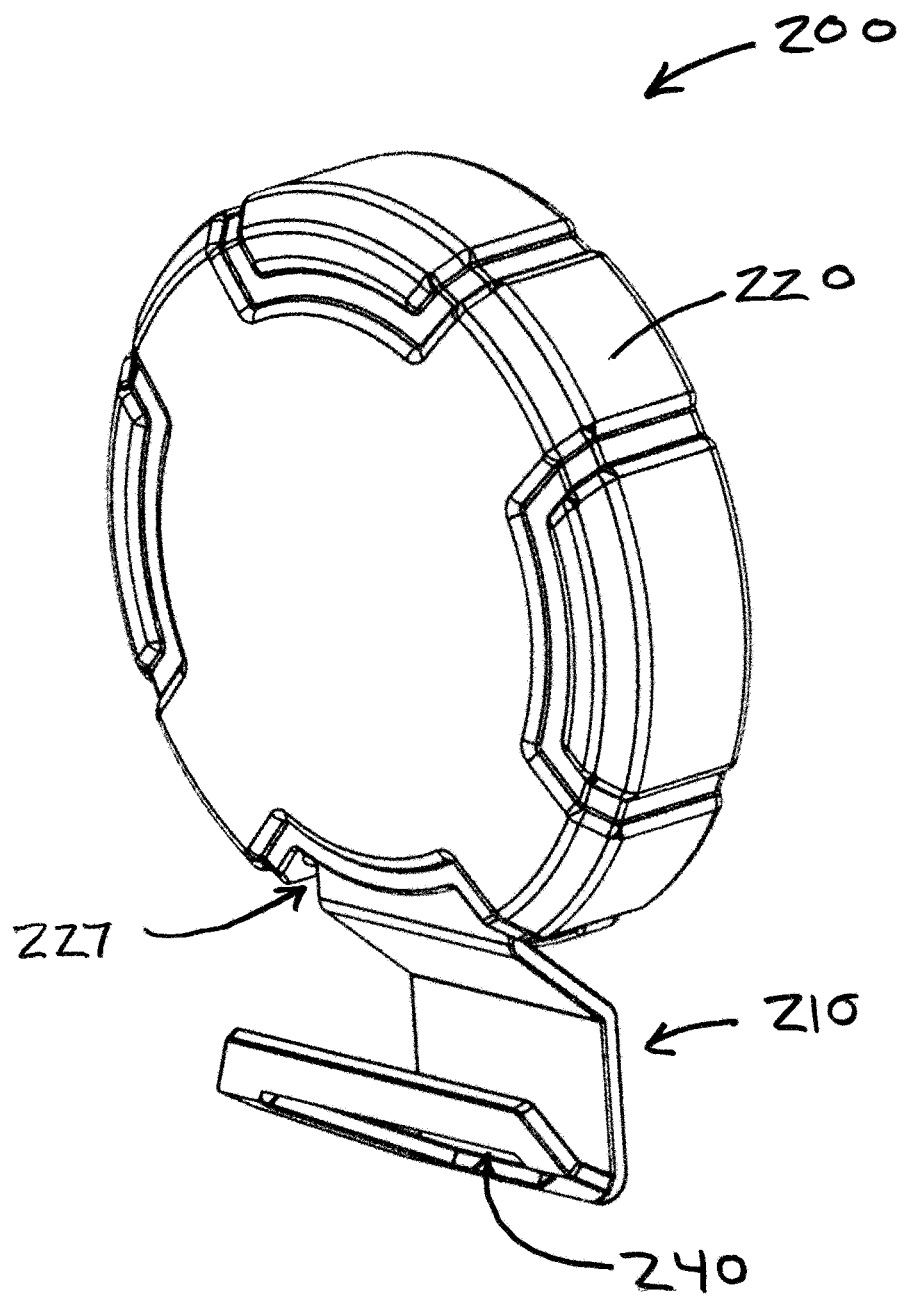
FIG. 8 depicts a perspective view of the hinge button hook embodiment of FIG. 7.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

A typical prior-art multi-position ladder incorporating the ladder storage devices of the present invention is disclosed FIGS. 1-6. A multi-position ladder will conventionally include four inner rails 120 connected in pairs by a hinge 150 that is adjustable via a hinge lock 160 that allows each pair of outer rails 120 to rotate and vary the angle between the outer rails 120. Adjustably slidable to each inner rail 120 is an outer rail 110 for which an extension lock 180 allows the outer rails 110 to slide along the inner rails 120 to adjust the overall height of the ladder 100. Between the pairs of outer rails 110 are outer rail rungs 130 preferably attached to the outer rail front surfaces 117 and between the pairs of inner rails 120 are inner rail rungs 140 that preferably are within the profile of the inner rails 120. This arrangement allows each side of the ladder 100 to be independently adjustable in length for varied uses (such as on stairs). Other features that are commonly found on multi-position ladders include a foot 190 at the end of each outer rail 110 and each inner rail 120 as well as a hinge lock button 170 to release the hinge lock 160.

A first embodiment of the present invention is a multi-position ladder hinge button hook 200 as illustrated in detail in FIGS. 7-15. The button hook 200 provides the same basic functionality of a standard hinge lock button (i.e., releasing the ladder hinge lock 160 to allow hinge 150 to rotate), but provides a means of hanging tools, buckets, or materials for access while on the ladder 100. The ladder hinge button hook 200 is preferably comprised of three elements: a button base 230, a button cap 220, and a hanger 210.

The button cap 220 is designed to snap fit onto the button base 220 at the end of the center lock pin (not shown) of a multi-position ladder hinge 160. The button cap 220 includes a hanger orifice 227 through which the hanger 210 protrudes through while being sandwiched between the button cap 220 and button base 230. The hanger orifice 227 is sized to tightly accommodate the hanger 210 to eliminate any movement between the various parts that could lead to wear and loosening of the hanger 210 over time. Because the button cap 230 is exposed and snap fits to the button base 230, it is preferably manufactured by injection molding PVC plastic to allow some flexibility.

The button base 230 has a head portion 231 having a depth 233 and includes a base central lock pin orifice 237 through which the central lock pin of the hinge extends to the button cap 220. The button base 230 also includes an anti-rotation protrusion 235 that acts to prevent rotation of the hanger 210 from the rest of the button hook 200. Preferably the anti-rotation protrusion 235 is square or rectangular in shape to maximize prevention of rotation. The button base also includes a base inset 232 to accommodate the upper portion of the hanger 210 as well as mating projections (not shown) on the button cap 220 (i.e., the depth of the inset is greater than the hanger thickness 211). The base inset 232 is sized to tightly hold the hanger 210 to limit movement of the hanger 210 within the button base 232. The button base 230 is preferably manufactured of injection molded ABS plastic to provide strength and rigidity.

The hanger 210 includes a hanger central lock pin orifice 250 that aligns with the base central lock pin orifice 237 through which the central lock pin of the hinge extends to the button cap. The hanger 210 also includes an anti-rotation orifice 260 that is sized to accept the anti-rotation protrusion 235 of the button base 230. The hanger 210 includes a hanger orifice 240 to allow hanging of tools that have belt hooks. To allow the button hook 200 to hold the most weight possible, it is recommended that the hanger 210 be formed of steel, which provides durability and strength for cyclical hanging/removing items from the button hook 200 and for weight bearing. The hanger 210 includes an upper lip 215 at its end to aide in keeping tools and materials hung on the 210 by increasing the exit angle and decreasing the gap in the hanger 210.

Figure 9:
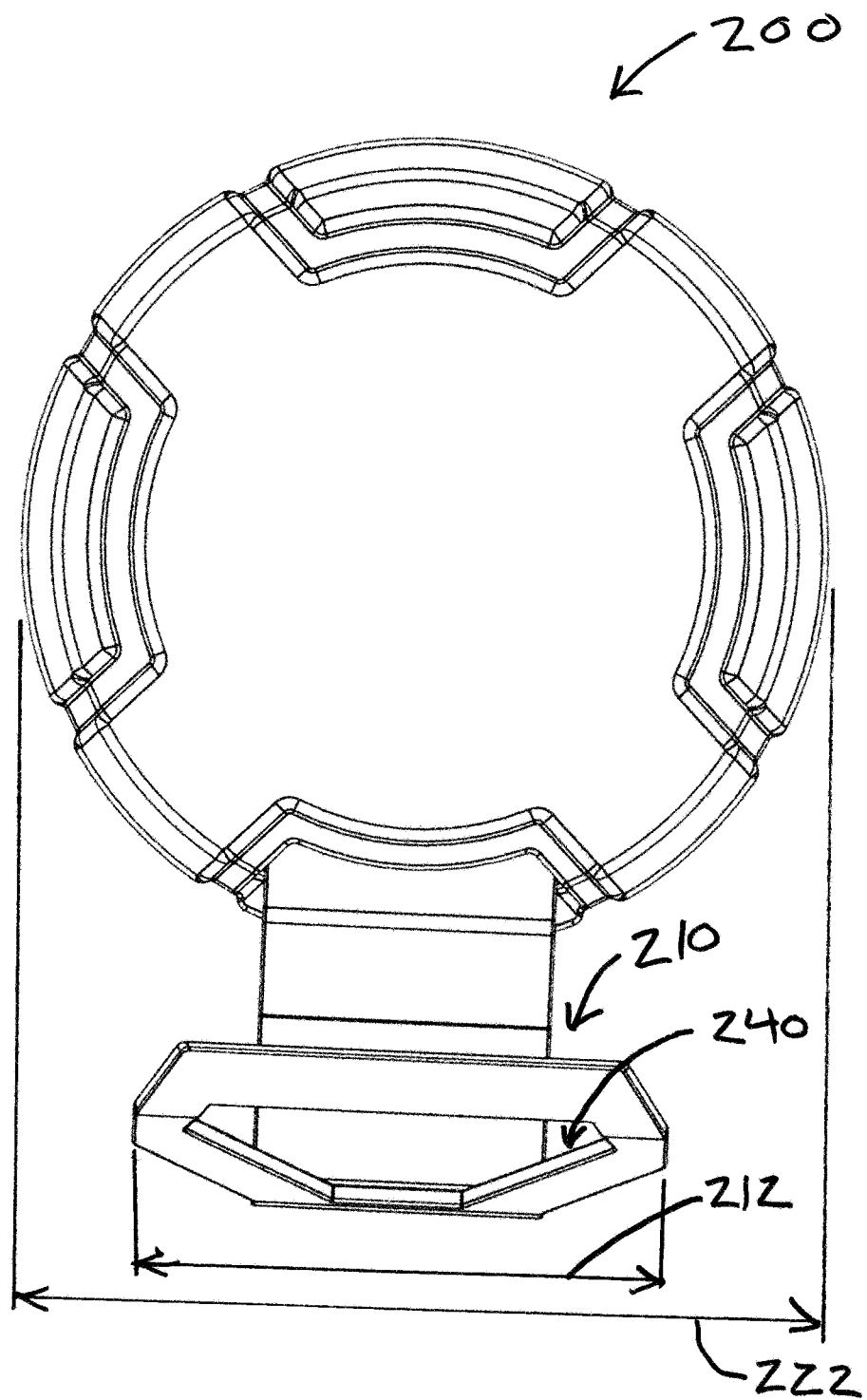
FIG. 9 depicts a front elevation view of the hinge button hook of FIG. 7.
Figure 12:
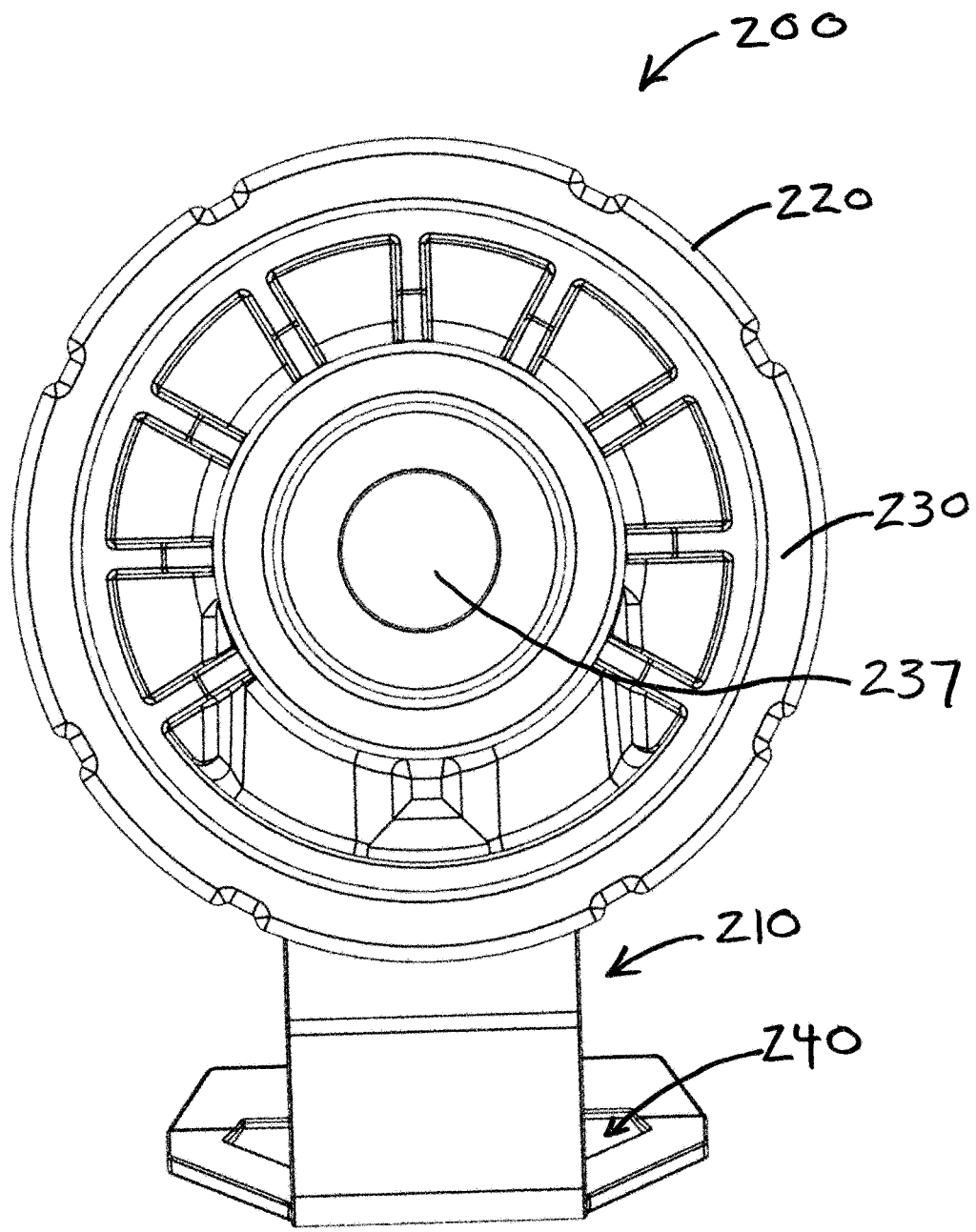
FIG. 12 depicts a rear elevation view of the hinge button hook of FIG. 7.
Figure 13:
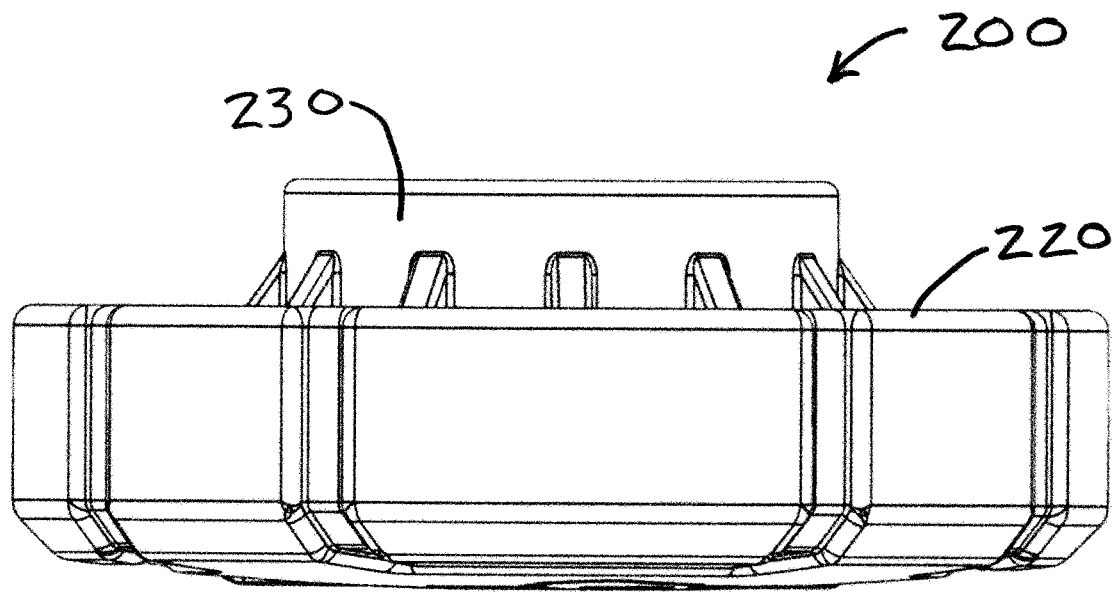
FIG. 13 depicts a top plan view of the hinge button hook of FIG. 7.
Figure 14:
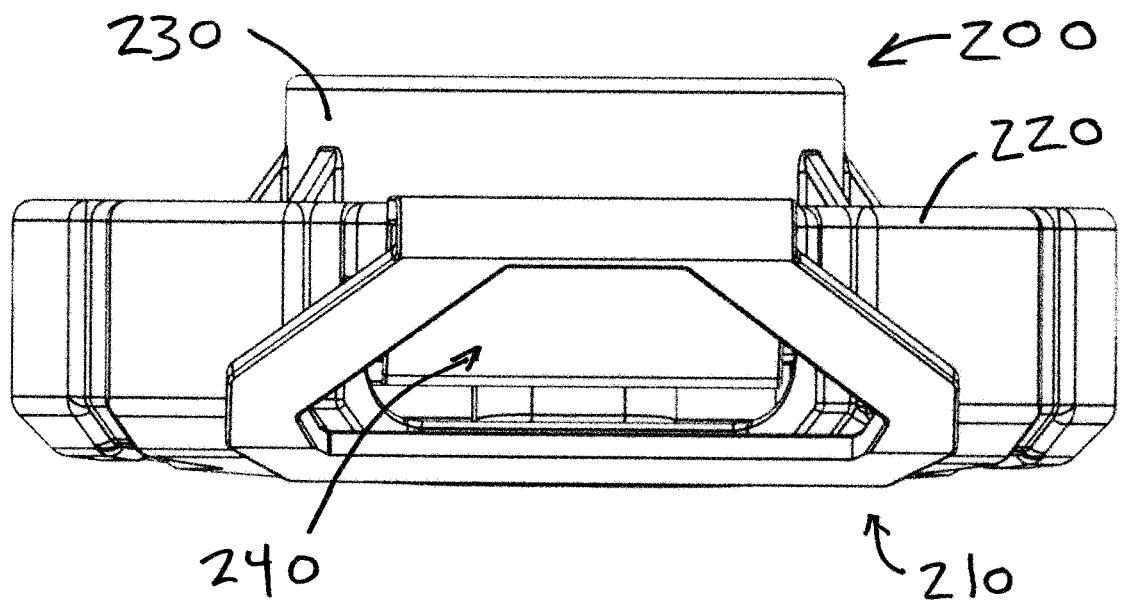
FIG. 14 depicts a bottom plan view of the hinge button hook of FIG. 7.
Figure 15:
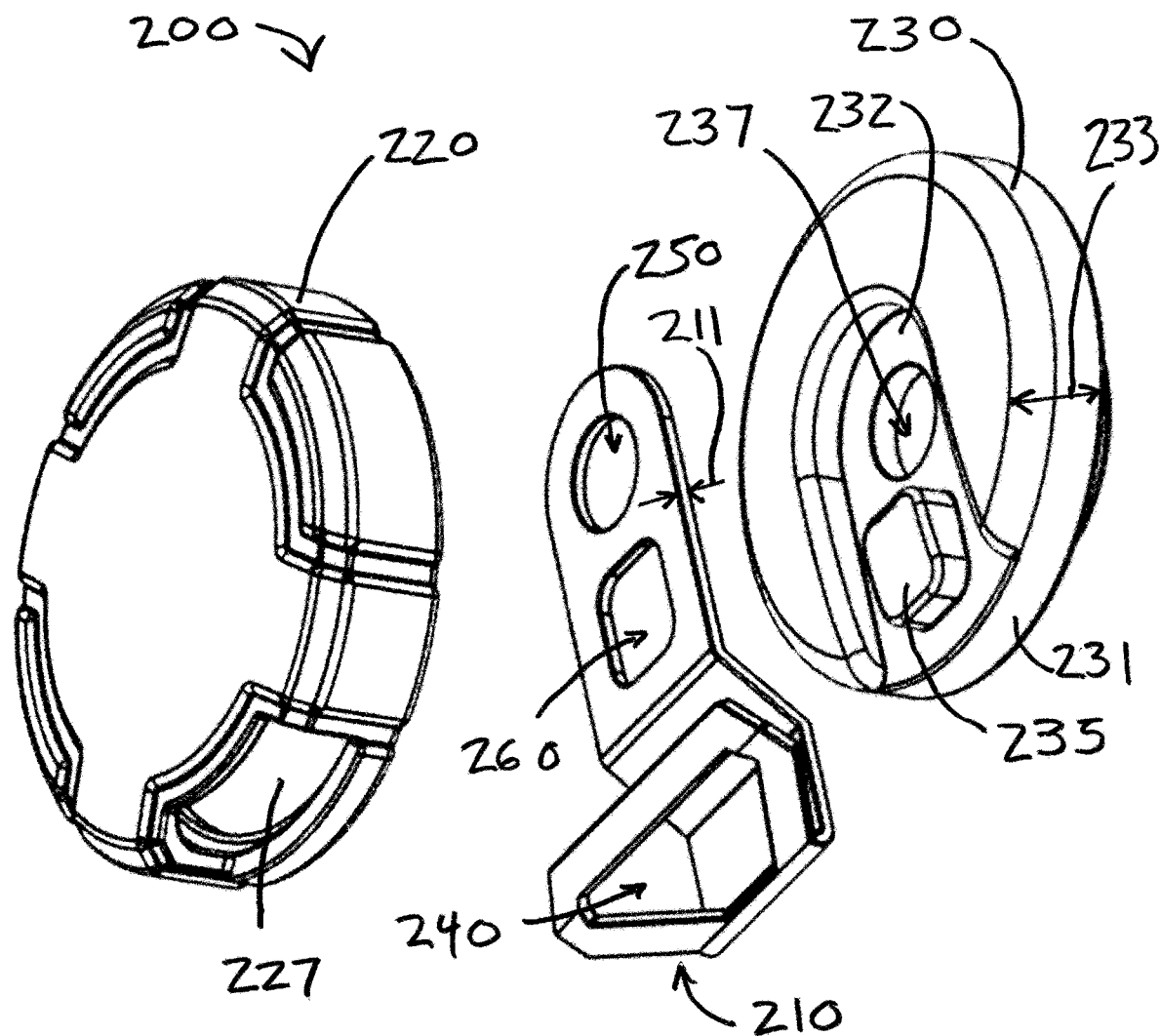
FIG. 15 depicts an exploded perspective view of the hinge button hook of FIG. 7.
Figure 16:
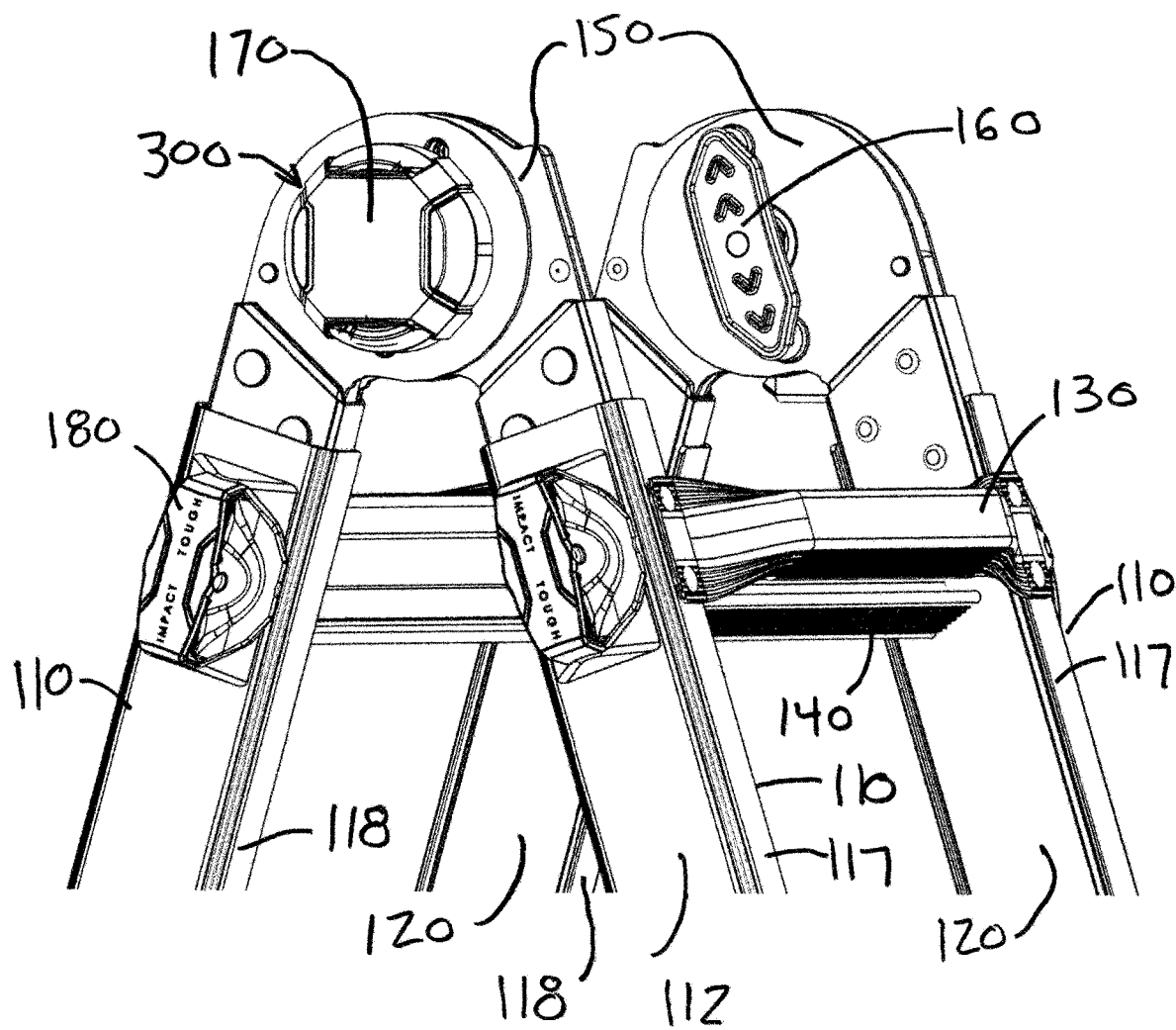
FIG. 16 depicts a close-up perspective view of the multi-position ladder of FIG. 4 providing more detail of a hinge button with slot embodiment.
Figure 17:
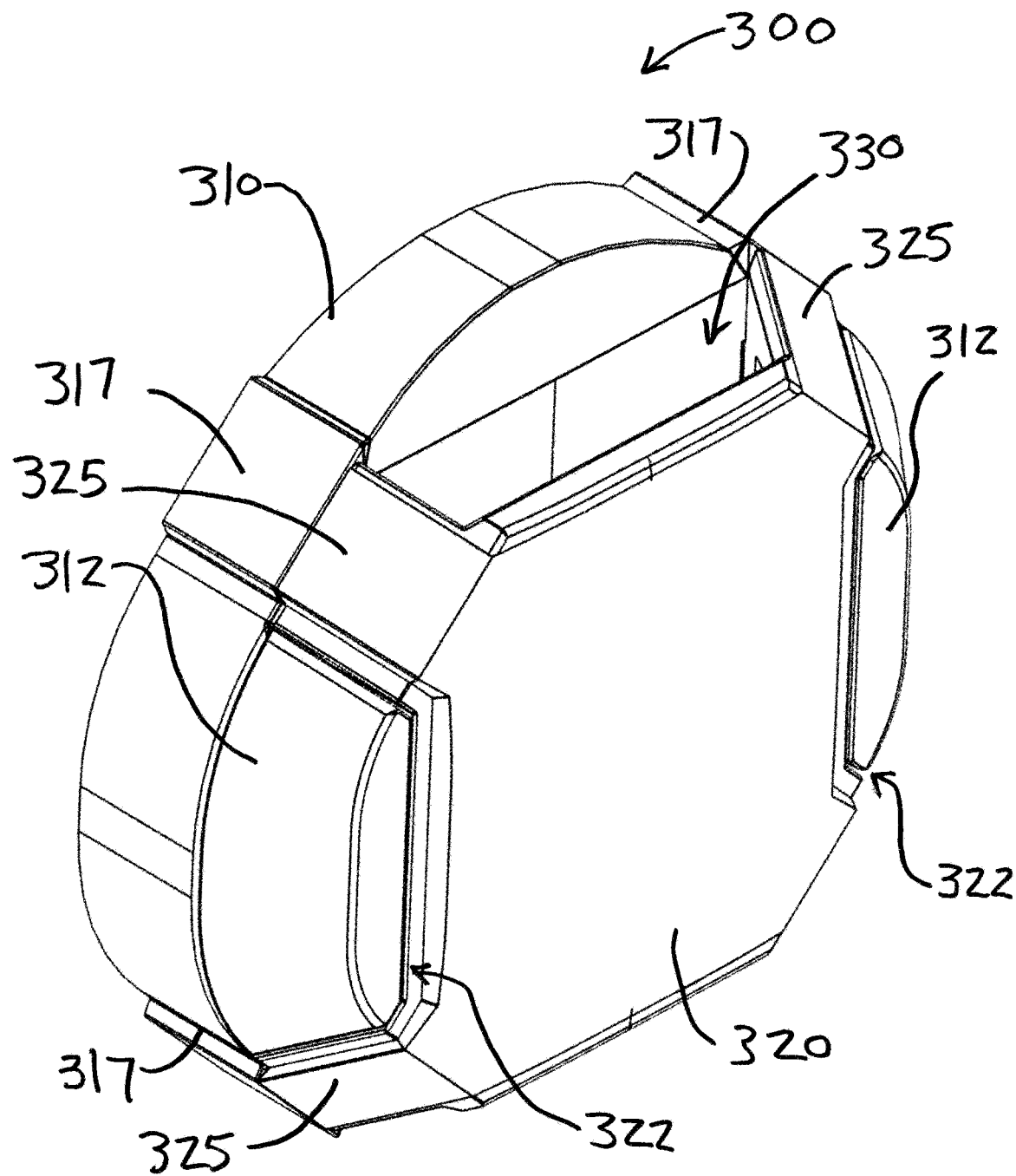
FIG. 17 depicts a perspective view of a hinge button with slot embodiment of FIG. 16.
Figure 18:
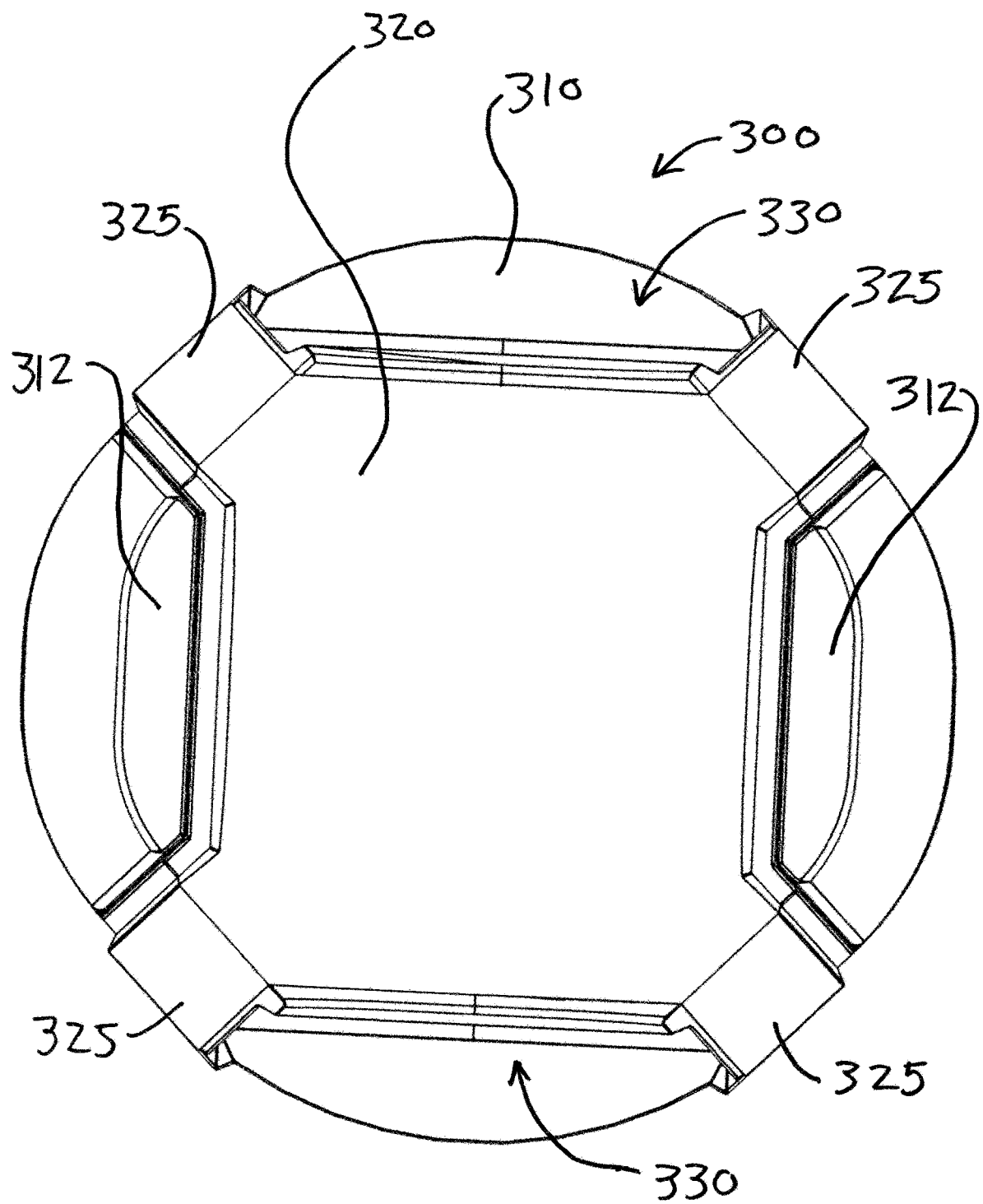
FIG. 18 depicts a front elevation view of the hinge button with slot of FIG. 16.
Figure 19:
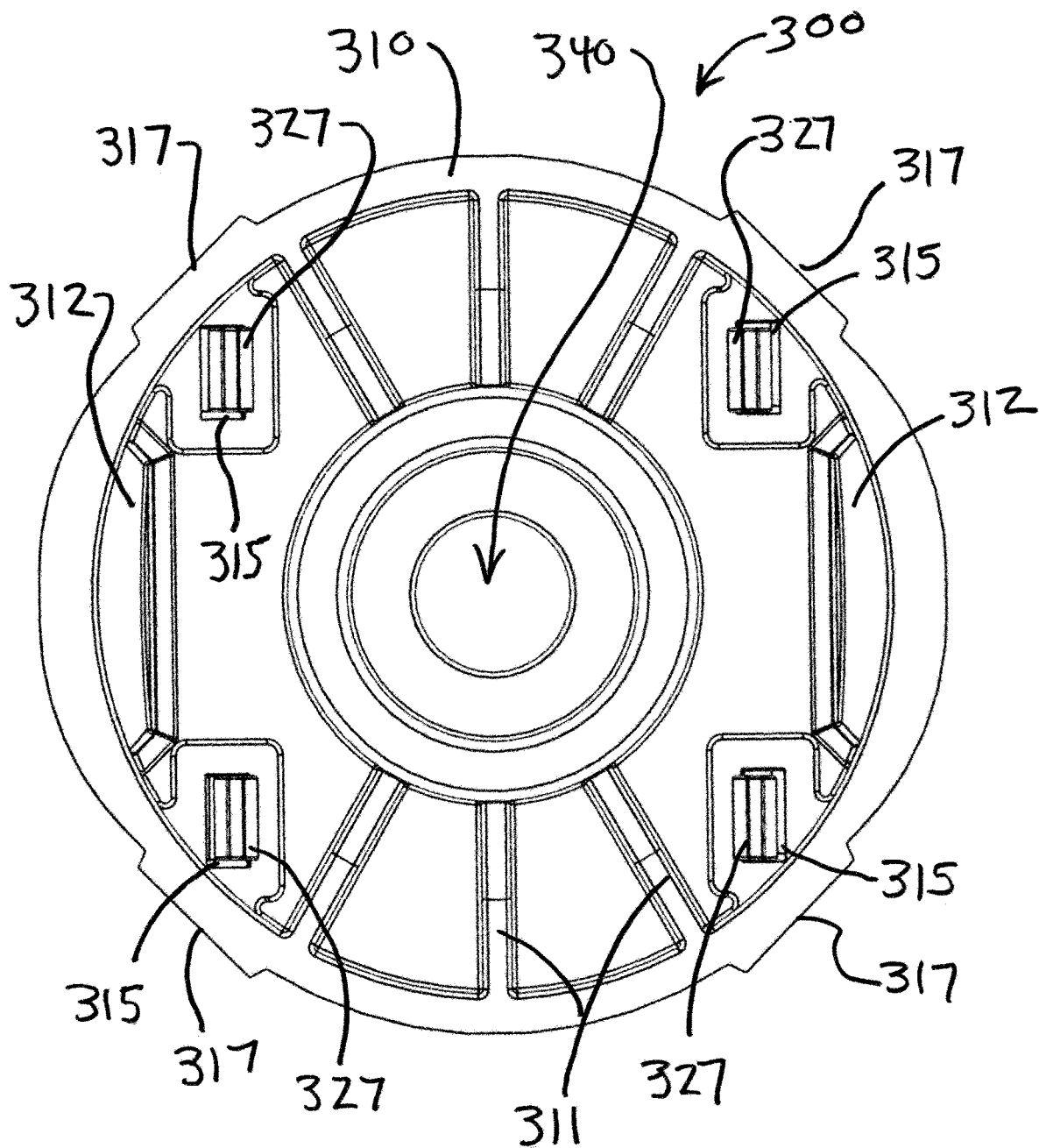
FIG. 19 depicts a rear elevation view of the hinge button hook of FIG. 16.
Figure 20:
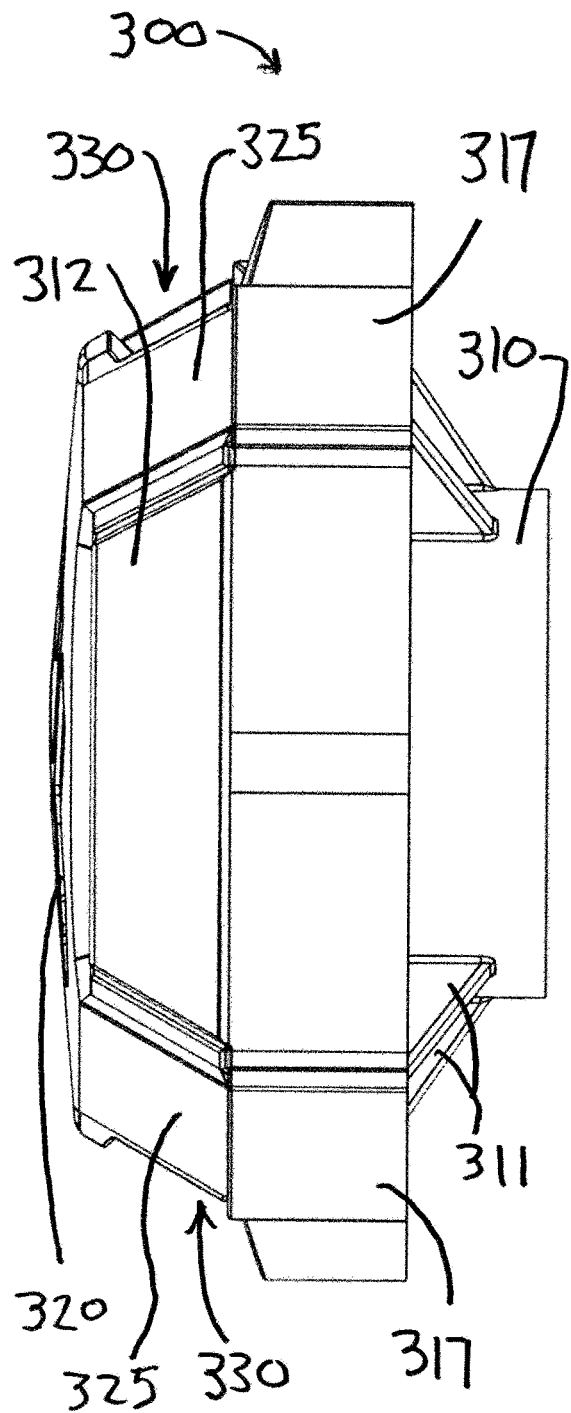
FIG. 20 depicts a right-side view of the hinge button with slot of FIG. 16.
Figure 21:
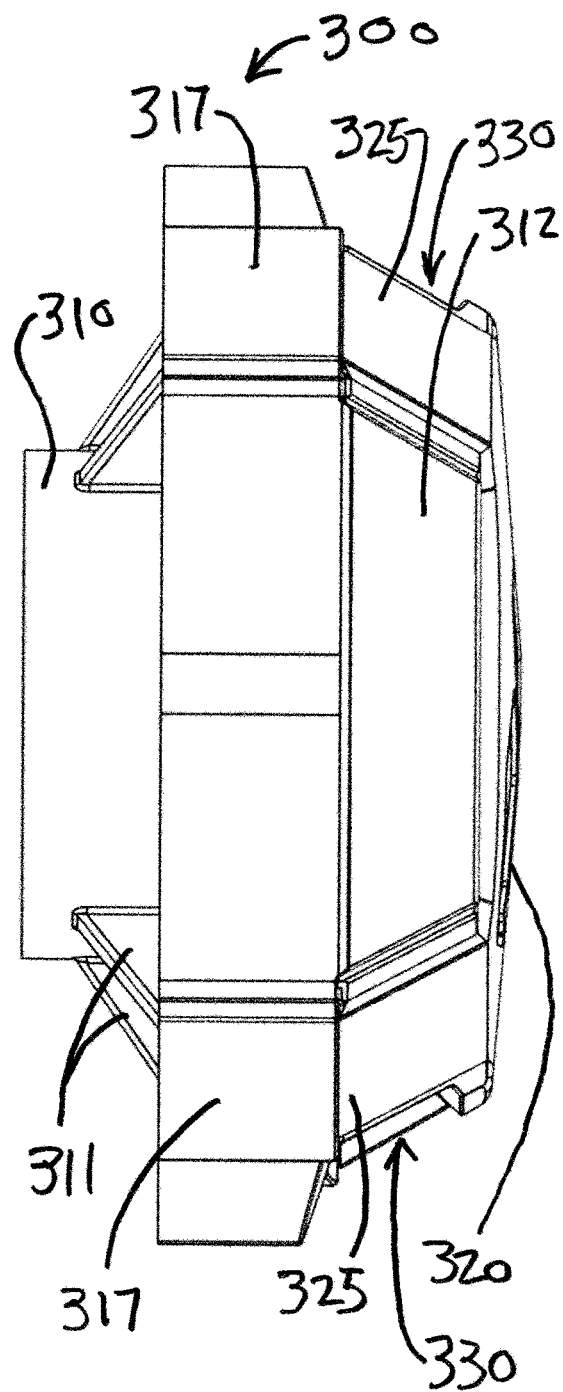
FIG. 21 depicts a left-side view of the hinge button with slot of FIG. 16.
Figure 22:
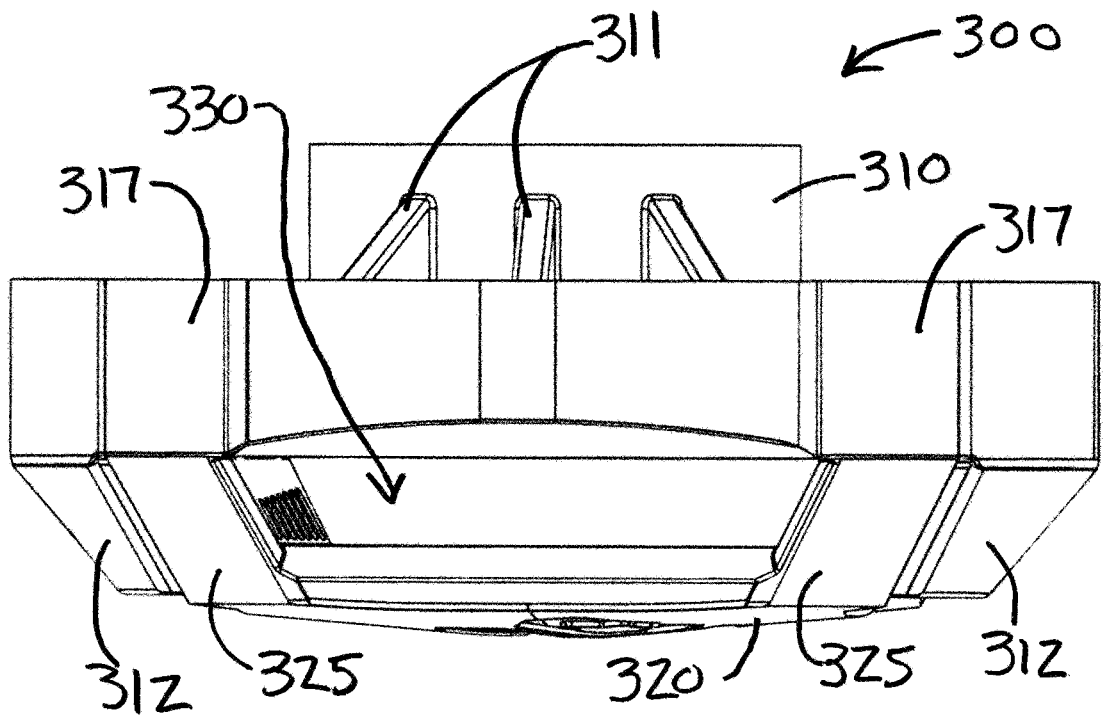
FIG. 22 depicts a top plan view of the hinge button with slot of FIG. 16.
Figure 23:
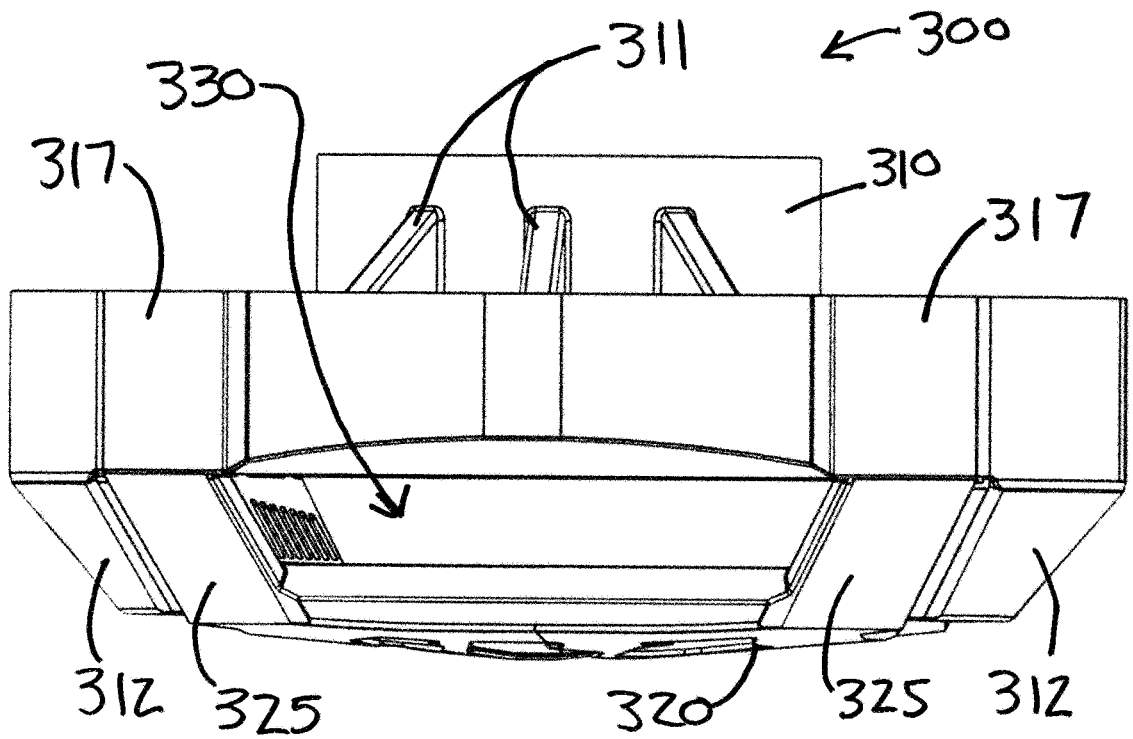
FIG. 23 depicts a bottom plan view of the hinge button with slot of FIG. 16.
Figure 24:
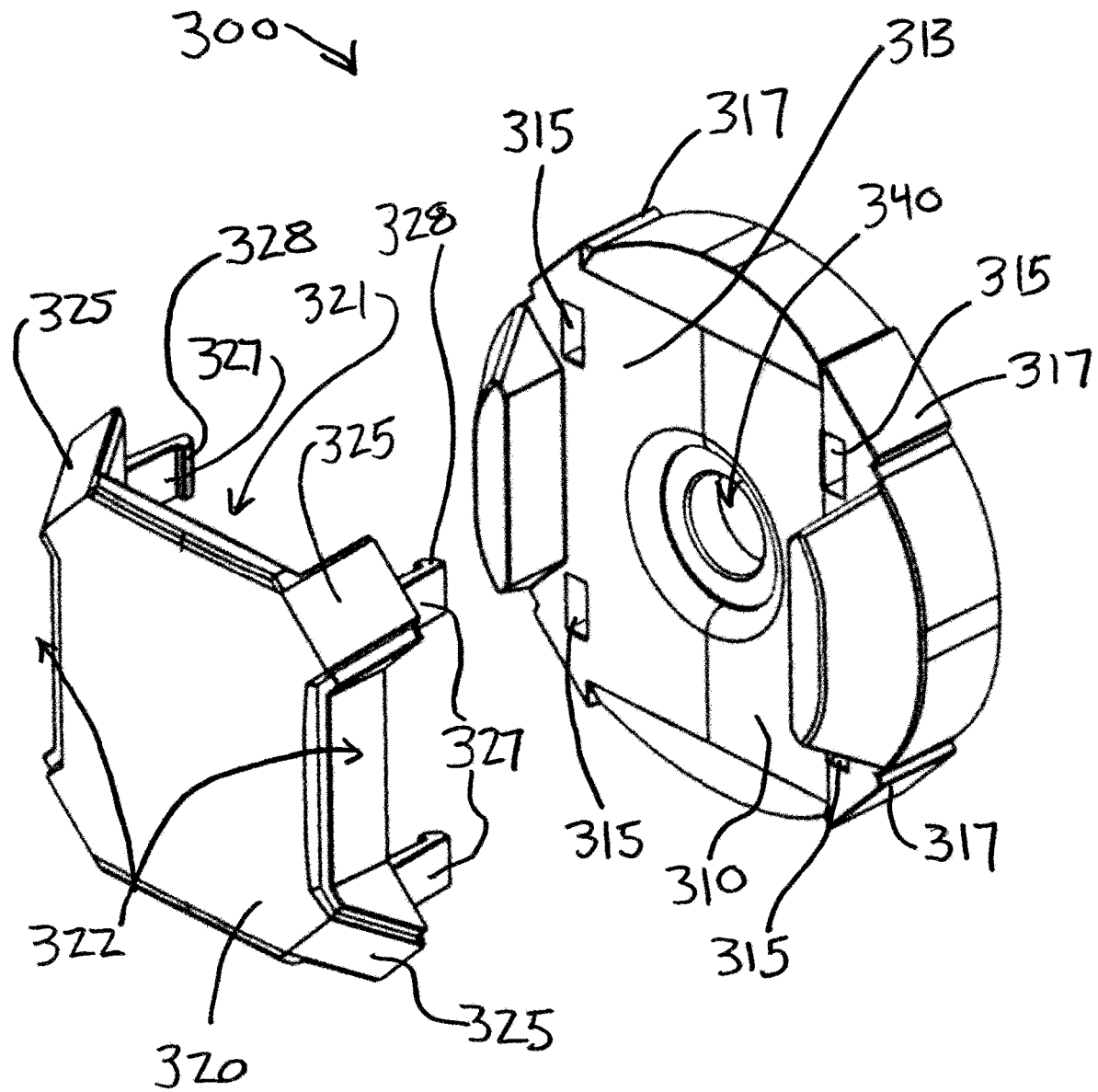
FIG. 24 depicts an exploded perspective view of the hinge button with slot of FIG. 16.
Figure 25:
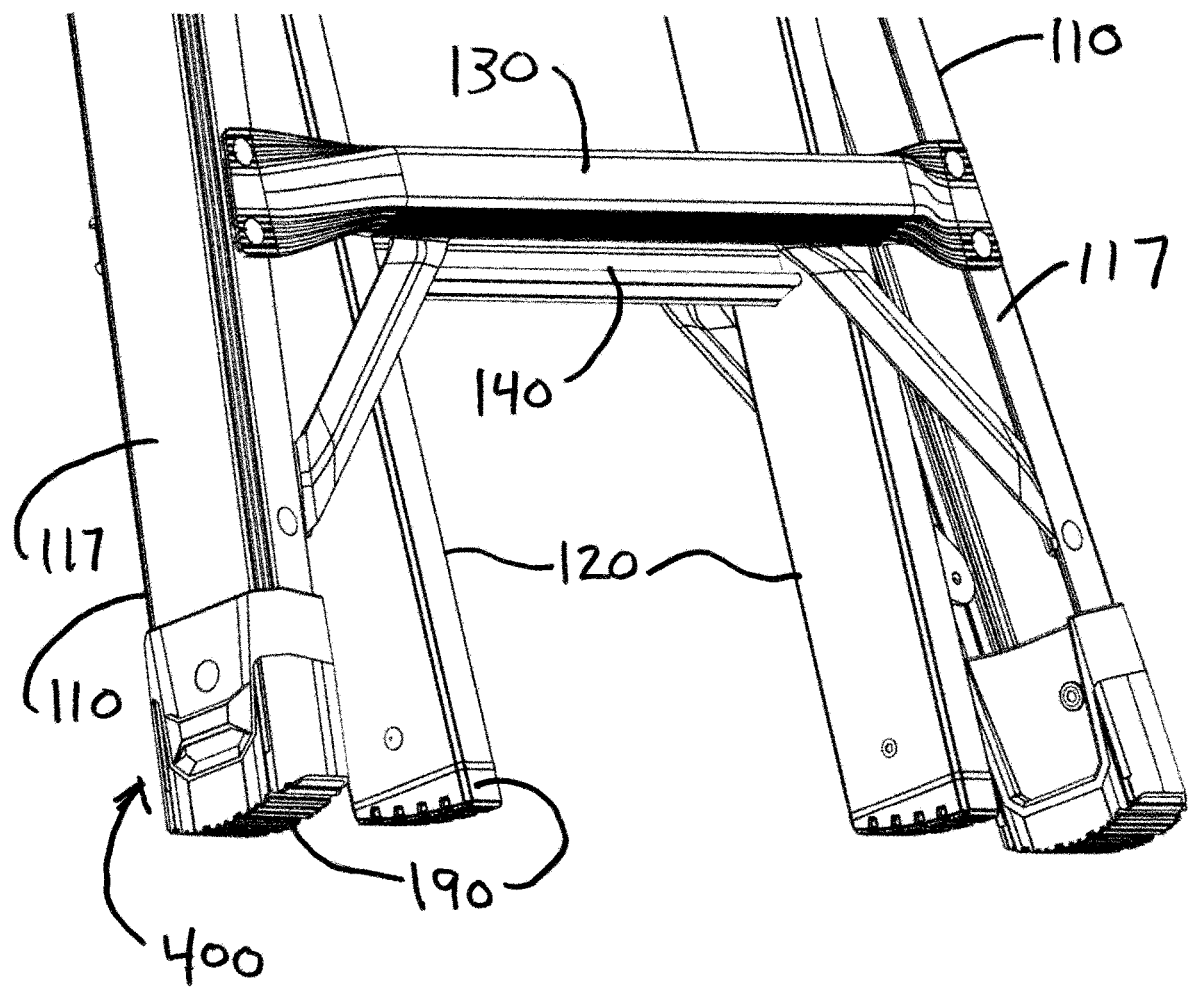
FIG. 25 depicts a close-up perspective view of the multi-position ladder of FIG. 3 providing more detail of a rail hook embodiment.
Figure 26:
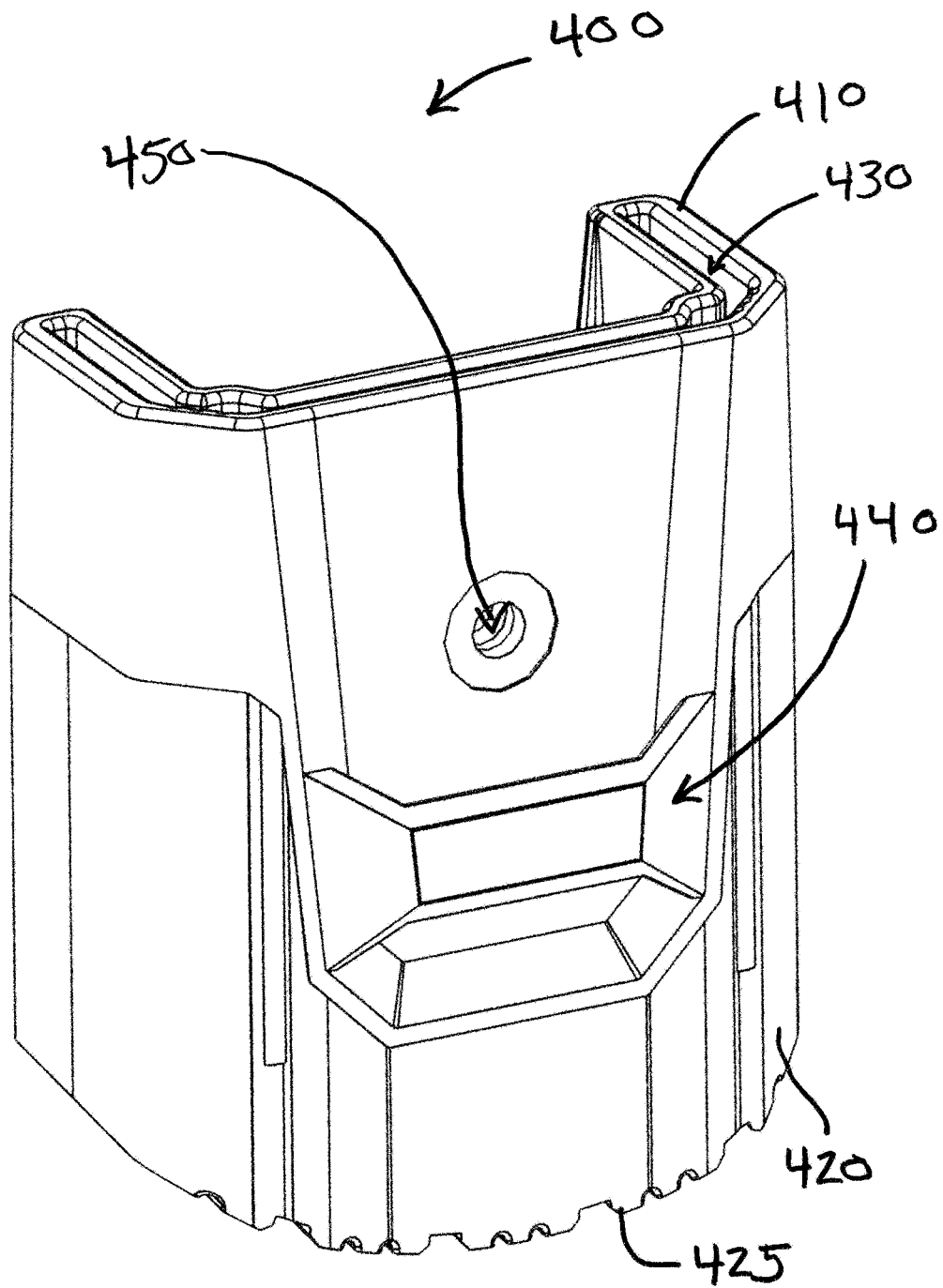
FIG. 26 depicts a perspective view of the rail hook of FIG. 25.
Figure 27:
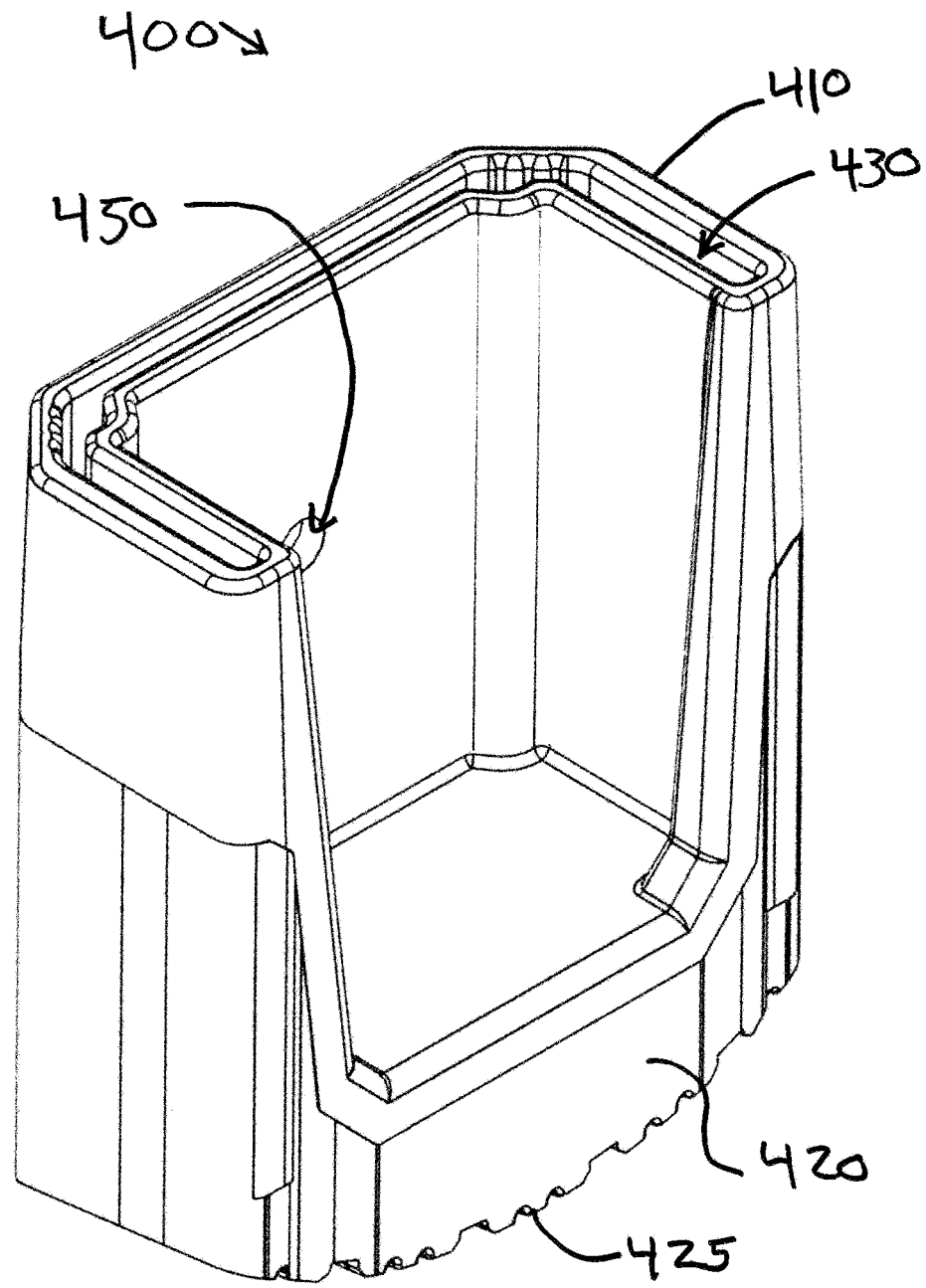
FIG. 27 depicts a second perspective view of the rail hook of FIG. 25.
Figure 28:
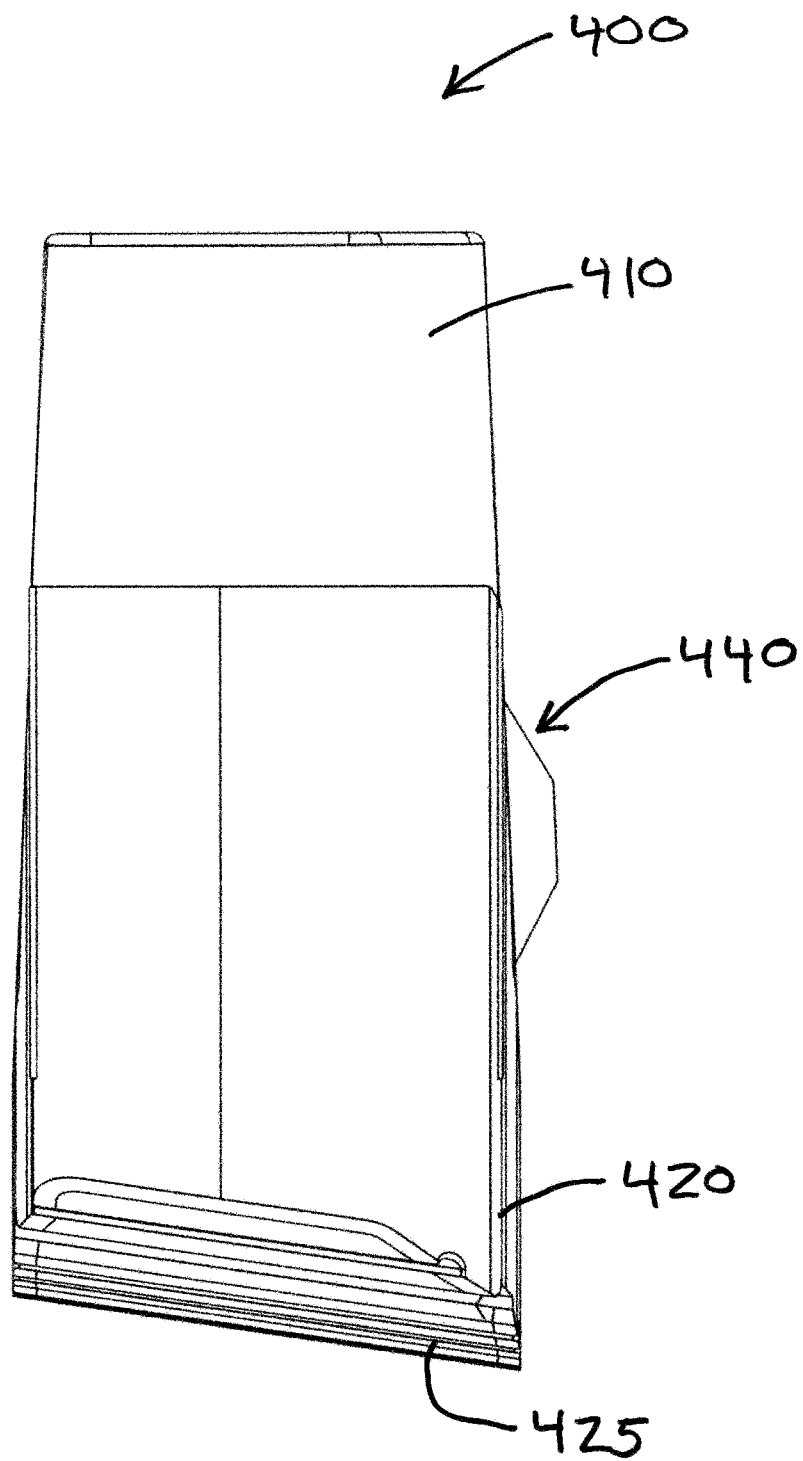
FIG. 28 depicts a right-side view of the rail hook of FIG. 25.
Figure 29:
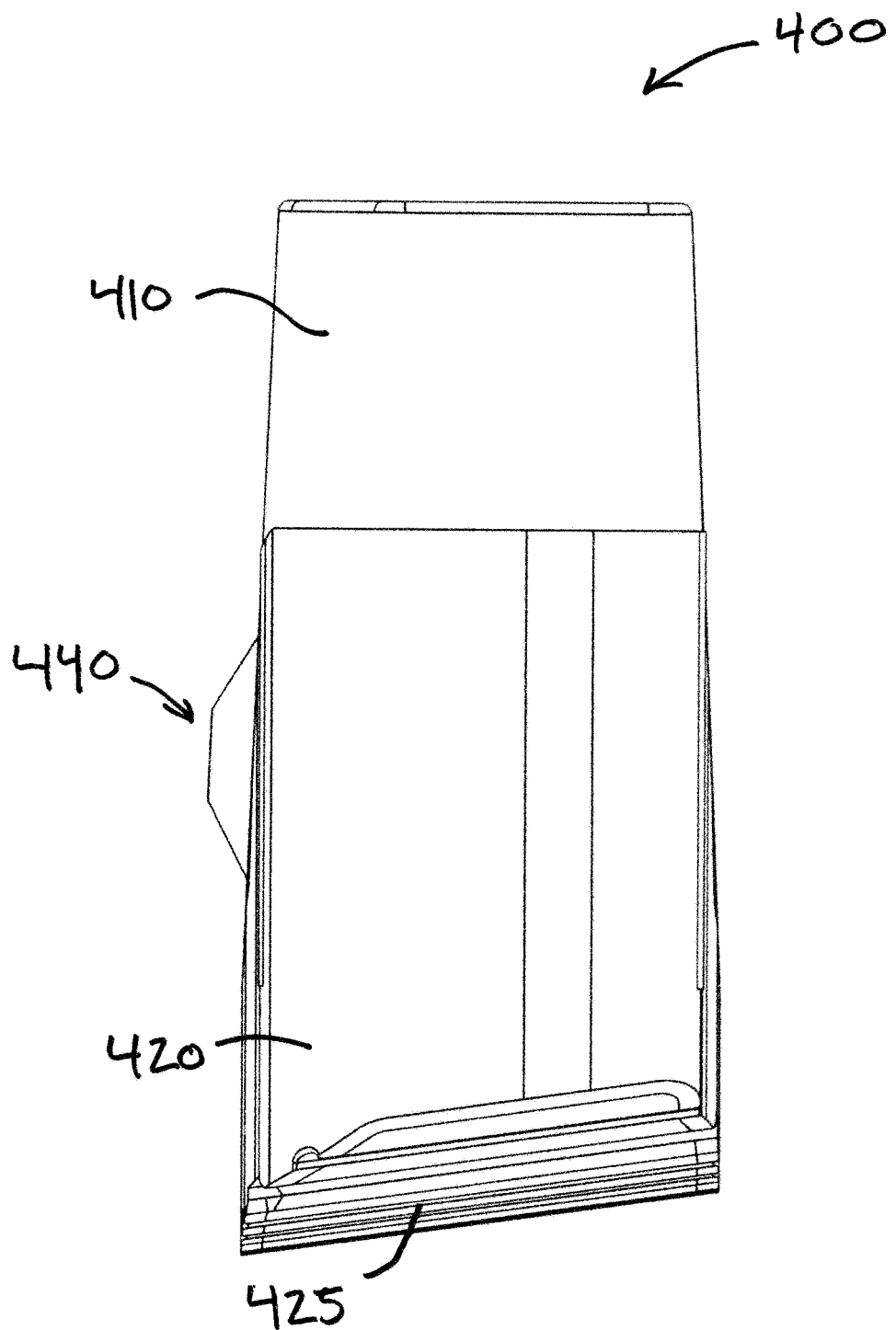
FIG. 29 depicts a left-side view of the rail hook of FIG. 25.
Figure 30:
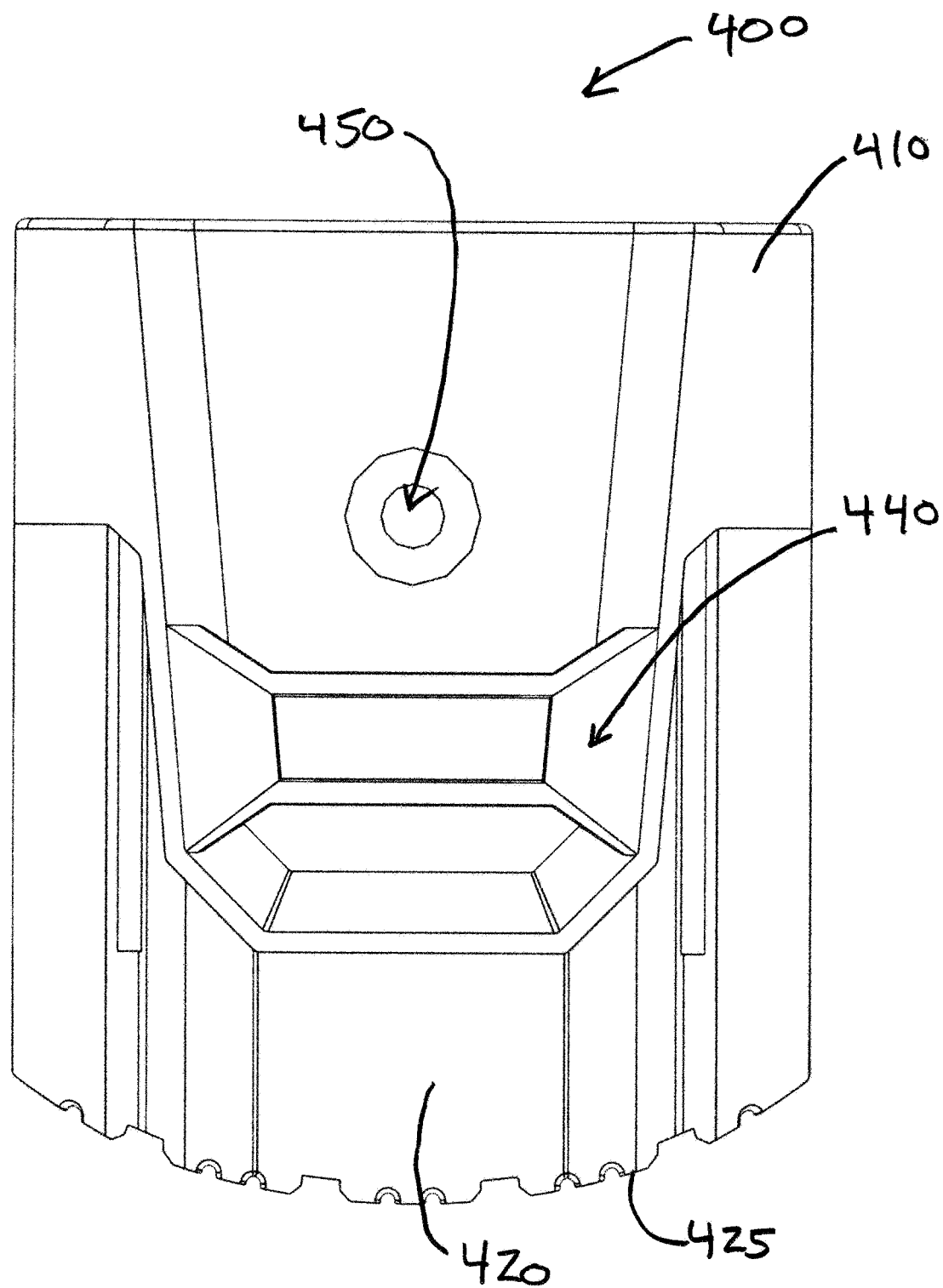
FIG. 30 depicts a front elevation view of the rail hook of FIG. 25.
Figure 31:
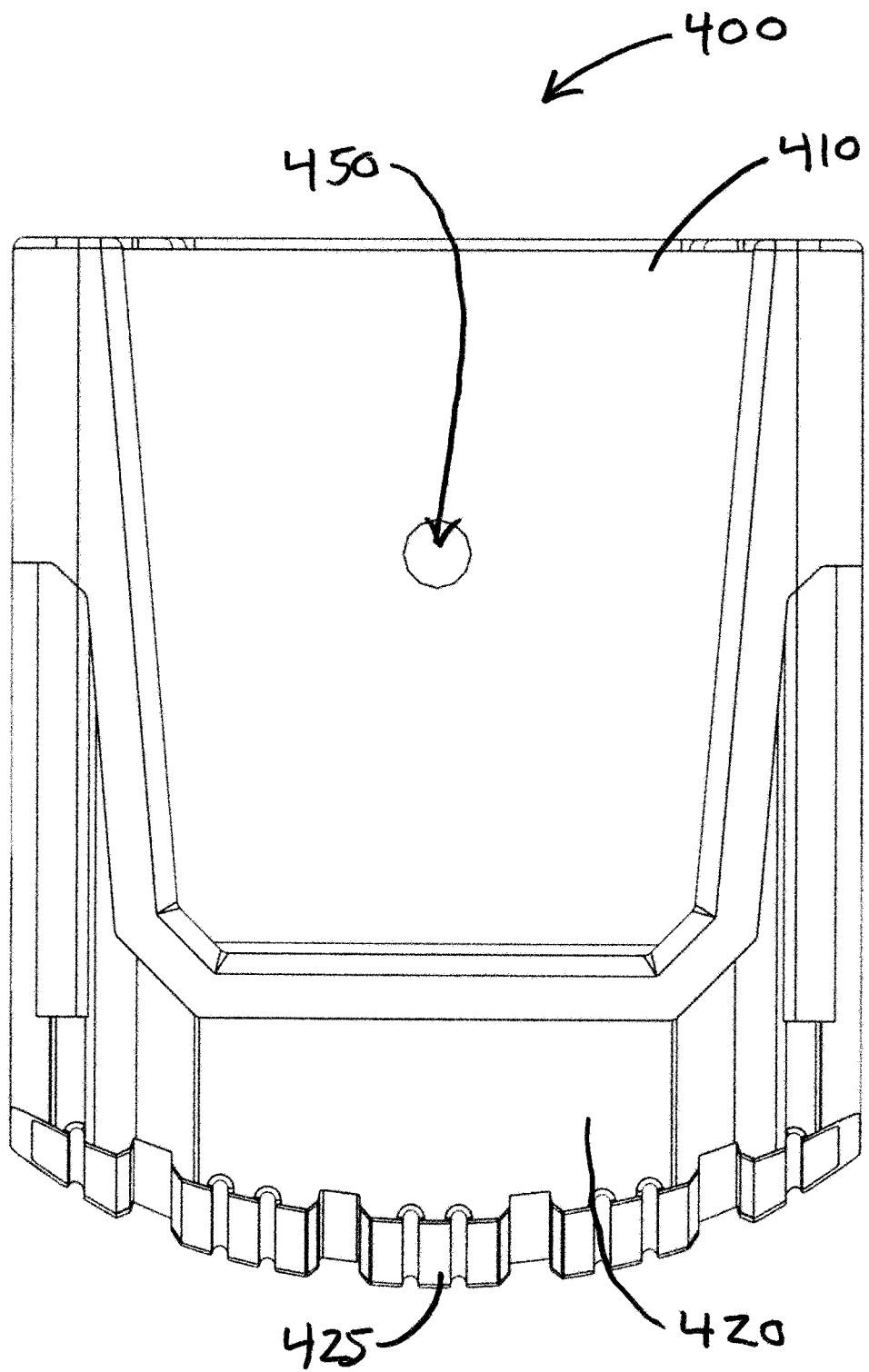
FIG. 31 depicts a rear elevation view of the rail hook of FIG. 25.
Figure 32:
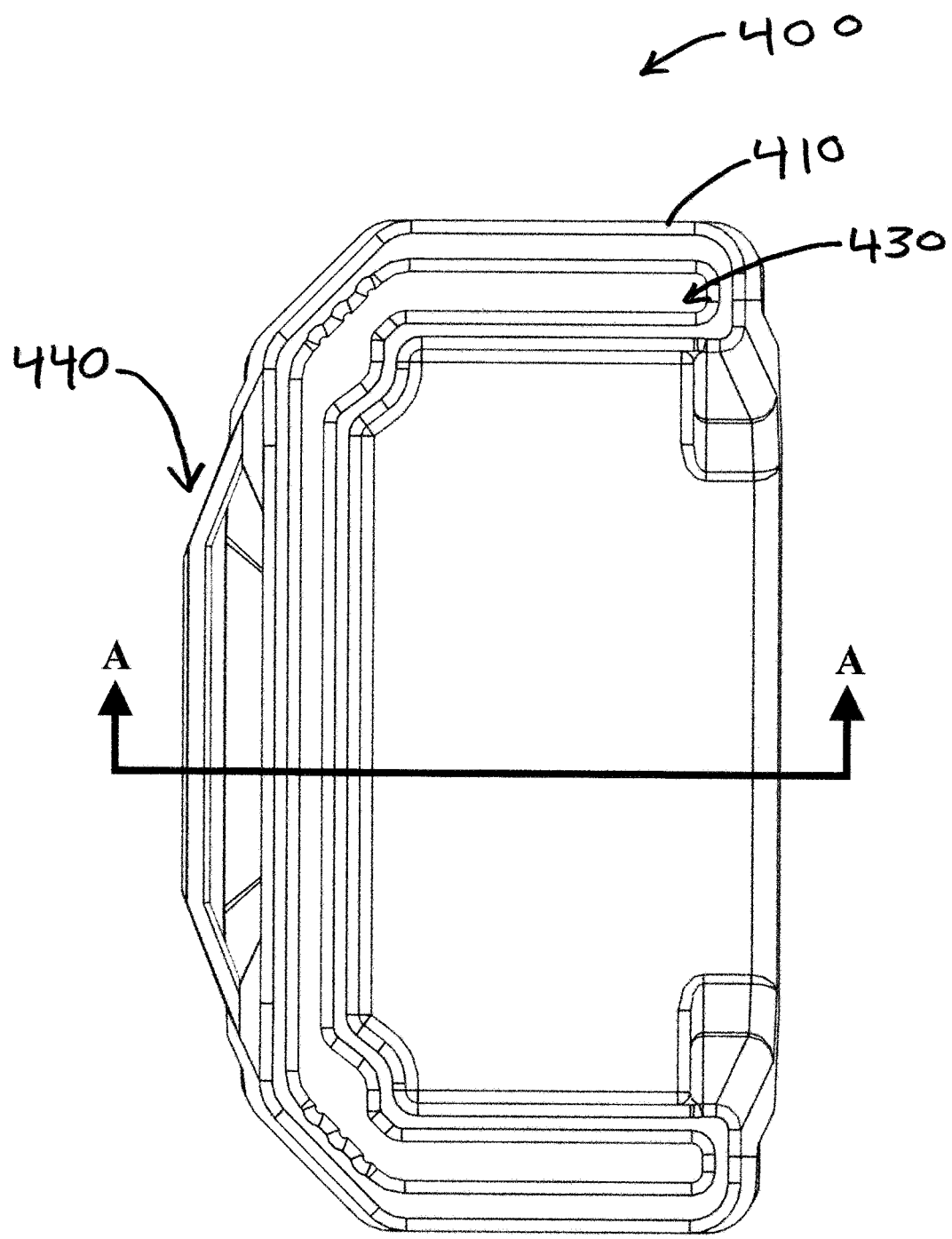
FIG. 32 depicts a top plan view of the rail hook of FIG. 25.
Figure 33:
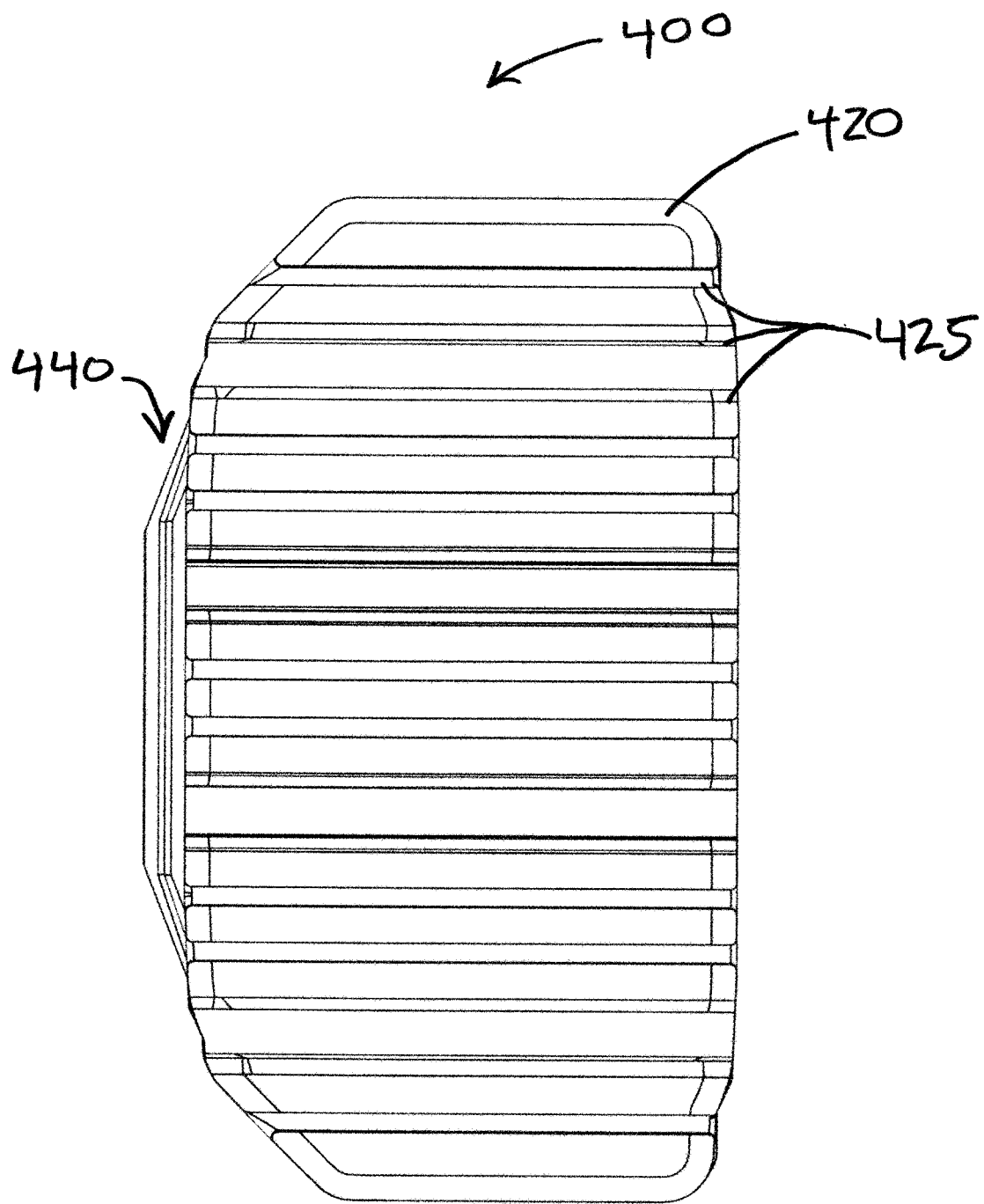
FIG. 33 depicts a bottom plan view of the rail hook of FIG. 25.
Figure 34:
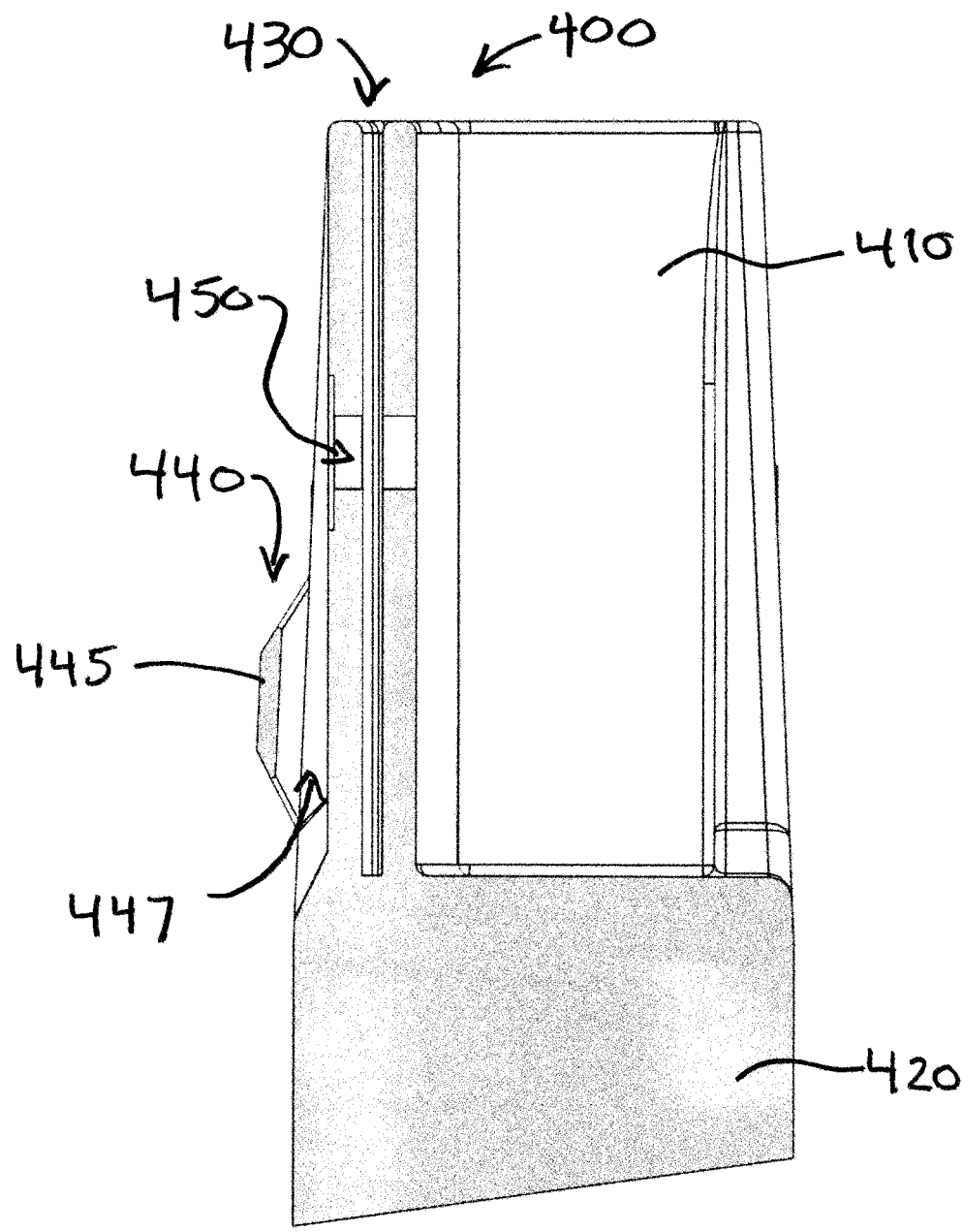
FIG. 34 depicts a cross-sectional view taken along the line A-A in FIG. 32.
Figure 35:
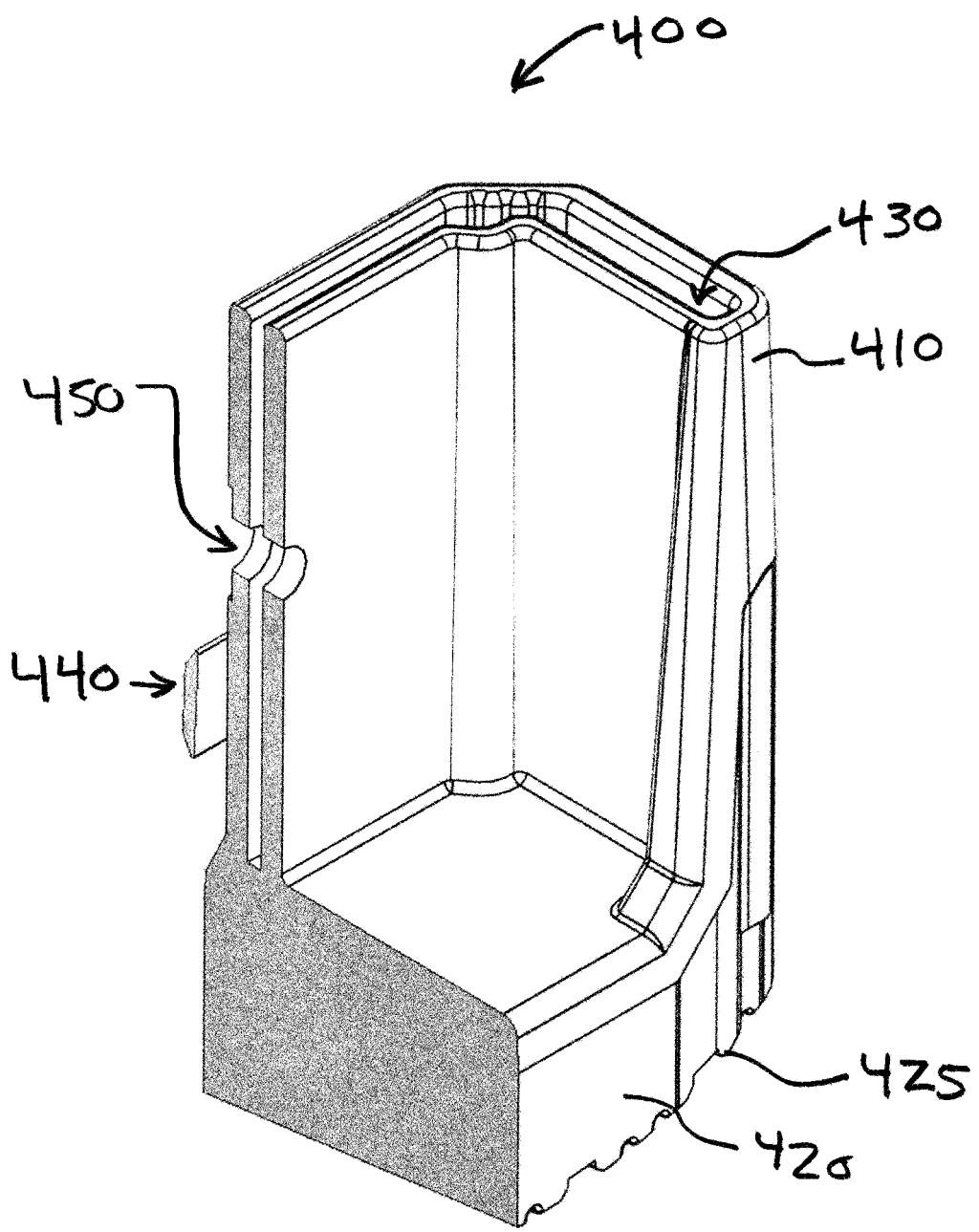
FIG. 35 depicts a perspective view of the cross-sectional view of FIG. 32.
Figure 36:
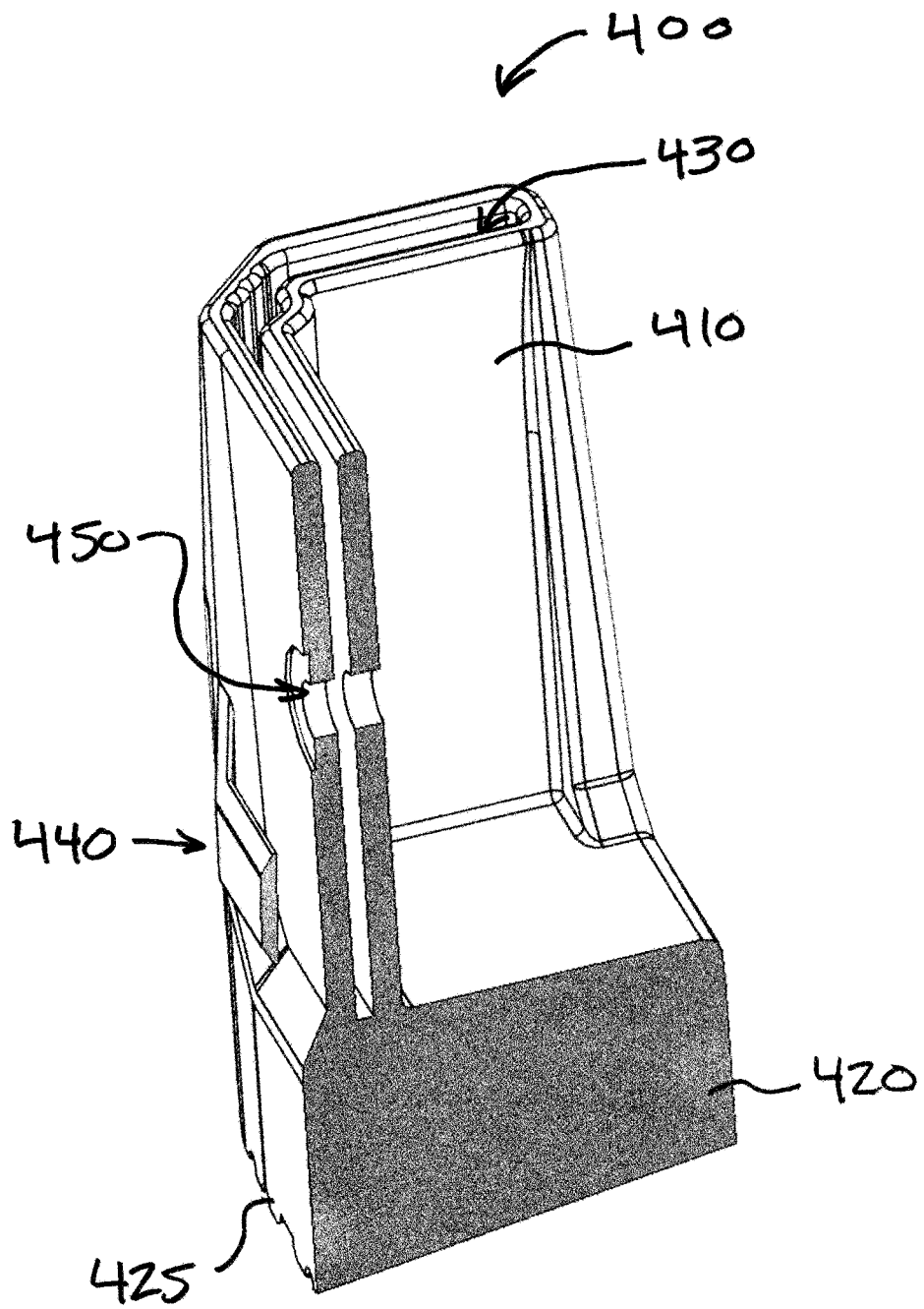
FIG. 36 depicts a second perspective view of the cross-sectional view of FIG. 32.
Figure 37:
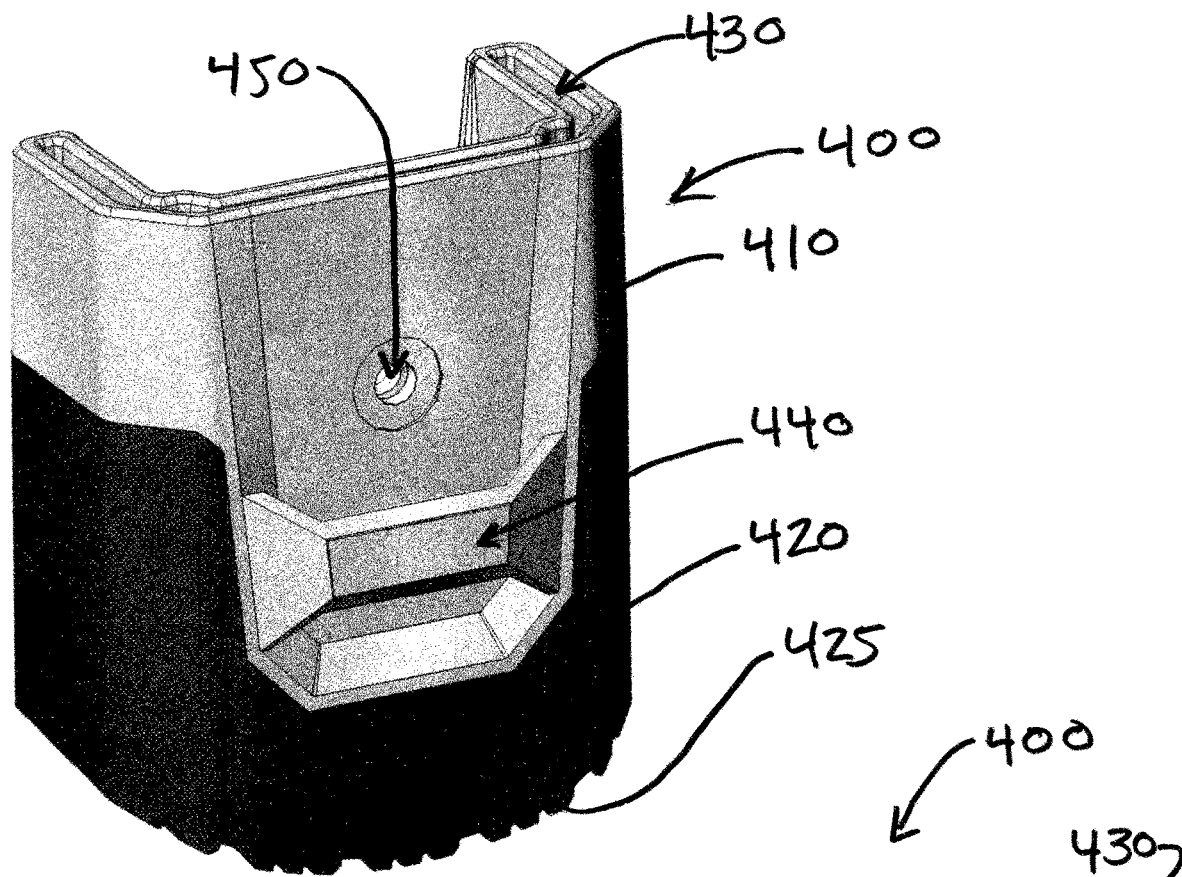
FIG. 37 depicts a shaded perspective view of the rail hook of FIG. 25.
Figure 38:
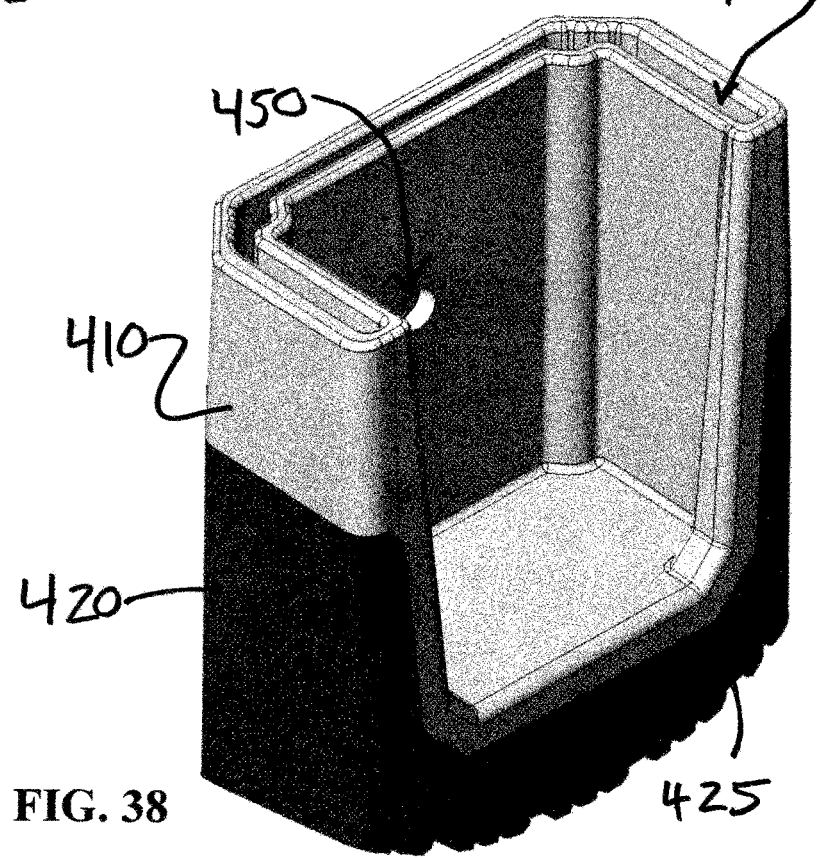
FIG. 38 depicts a second shaded perspective view of the rail hook of FIG. 25.
Figure 39:
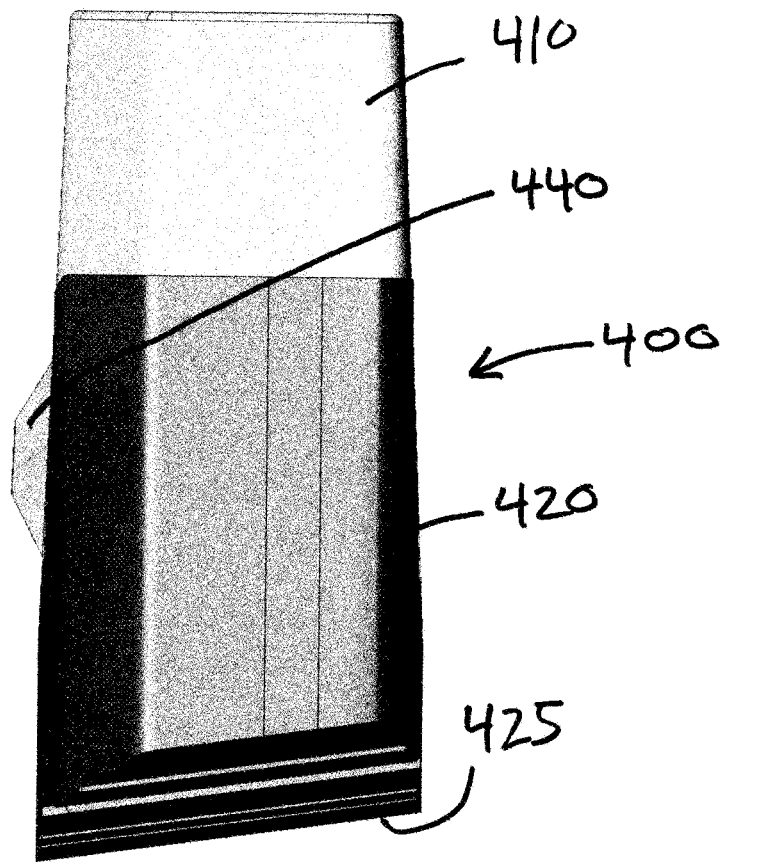
FIG. 39 depicts a shaded right-side view of the rail hook of FIG. 25.
Figure 40:
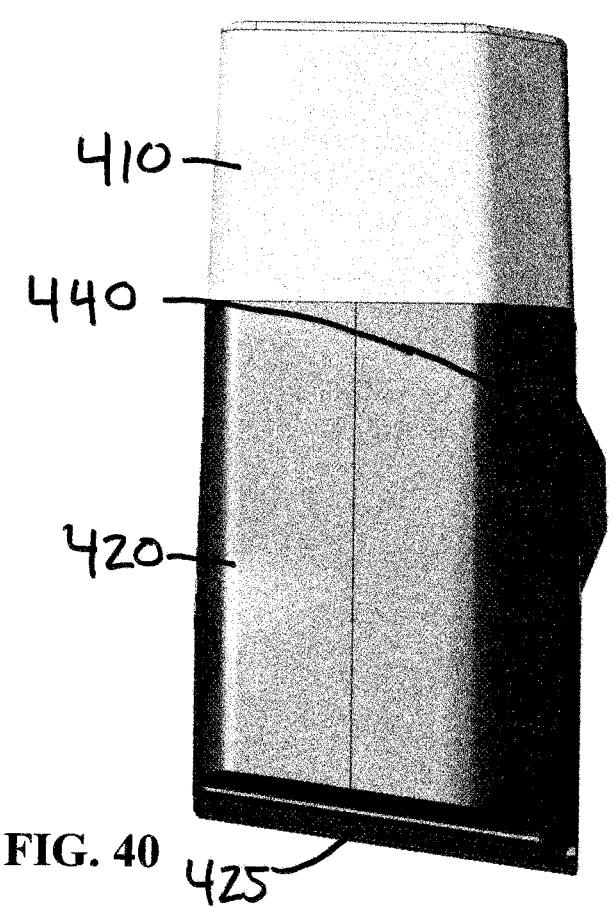
FIG. 40 depicts a shaded left-side view of the rail hook of FIG. 25.
Figure 41:
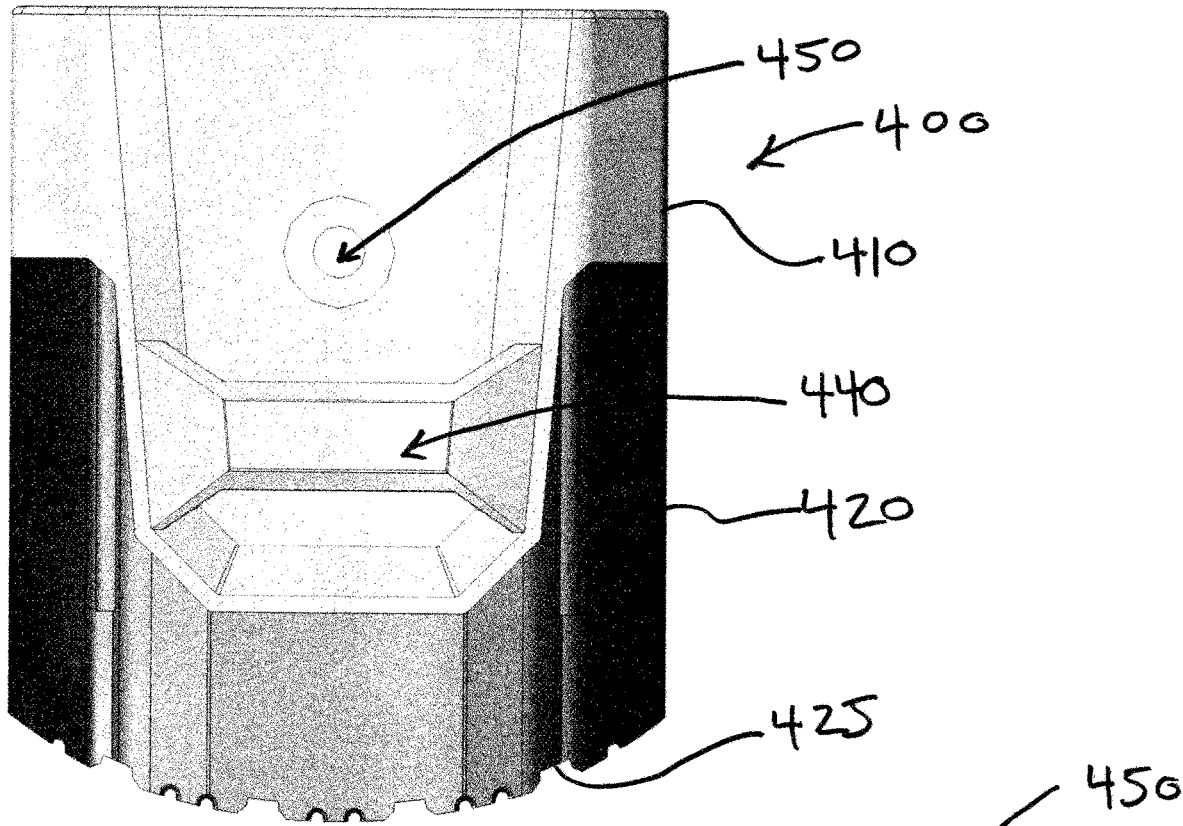
FIG. 41 depicts a shaded front elevation view of the rail hook of FIG. 25.
Figure 42:
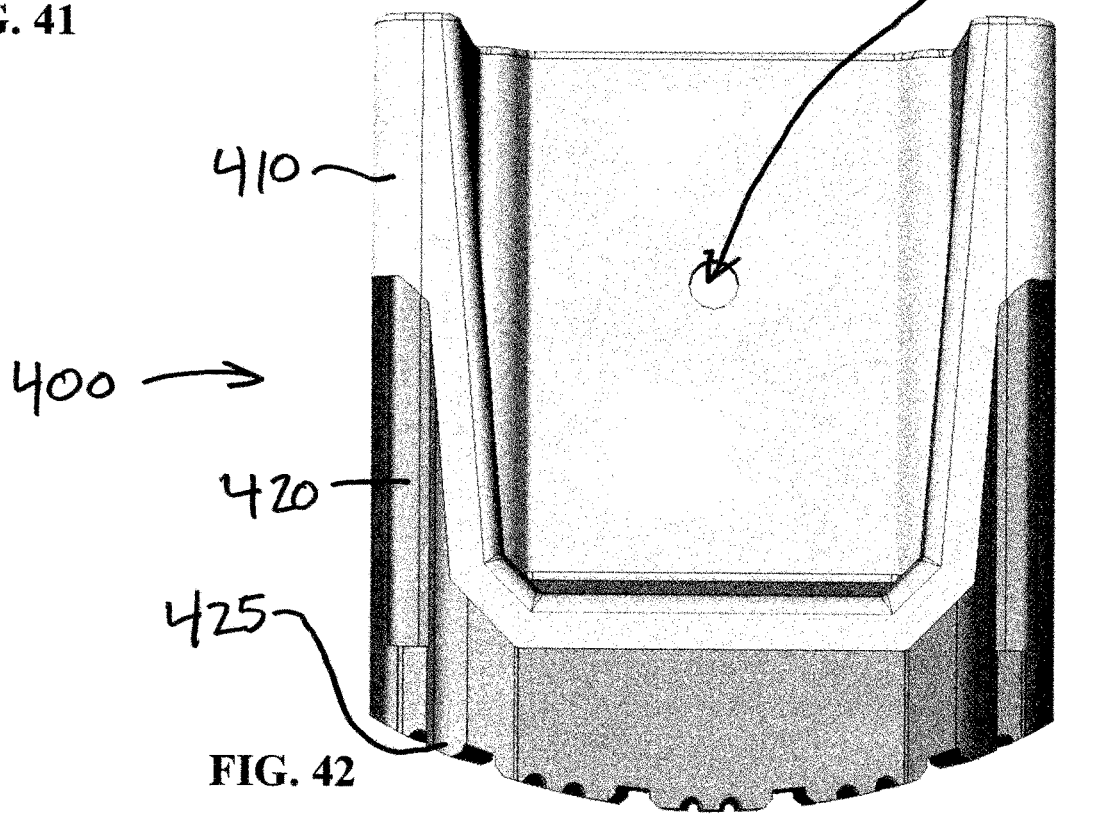
FIG. 42 depicts a shaded rear elevation view of the rail hook of FIG. 25.
Figure 43:
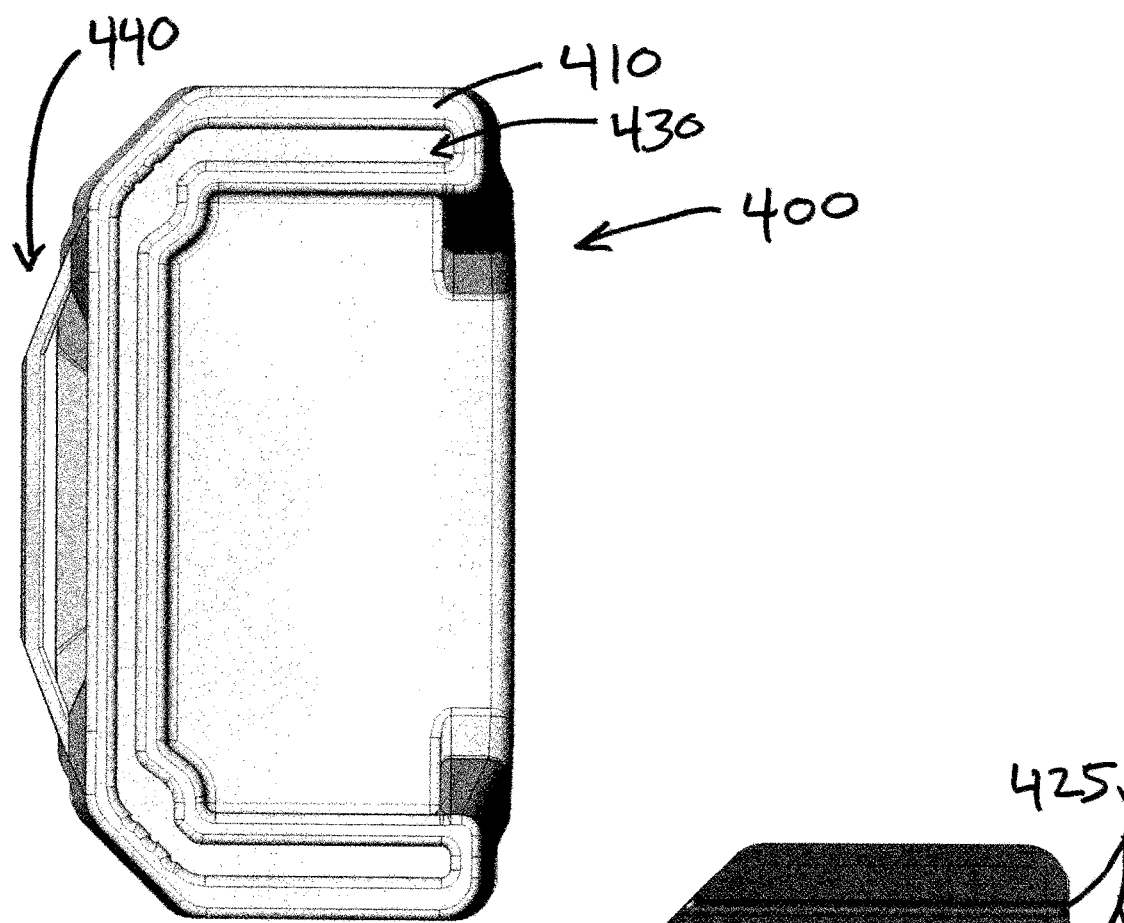
FIG. 43 depicts a shaded top plan view of the rail hook of FIG. 25.
Figure 44:
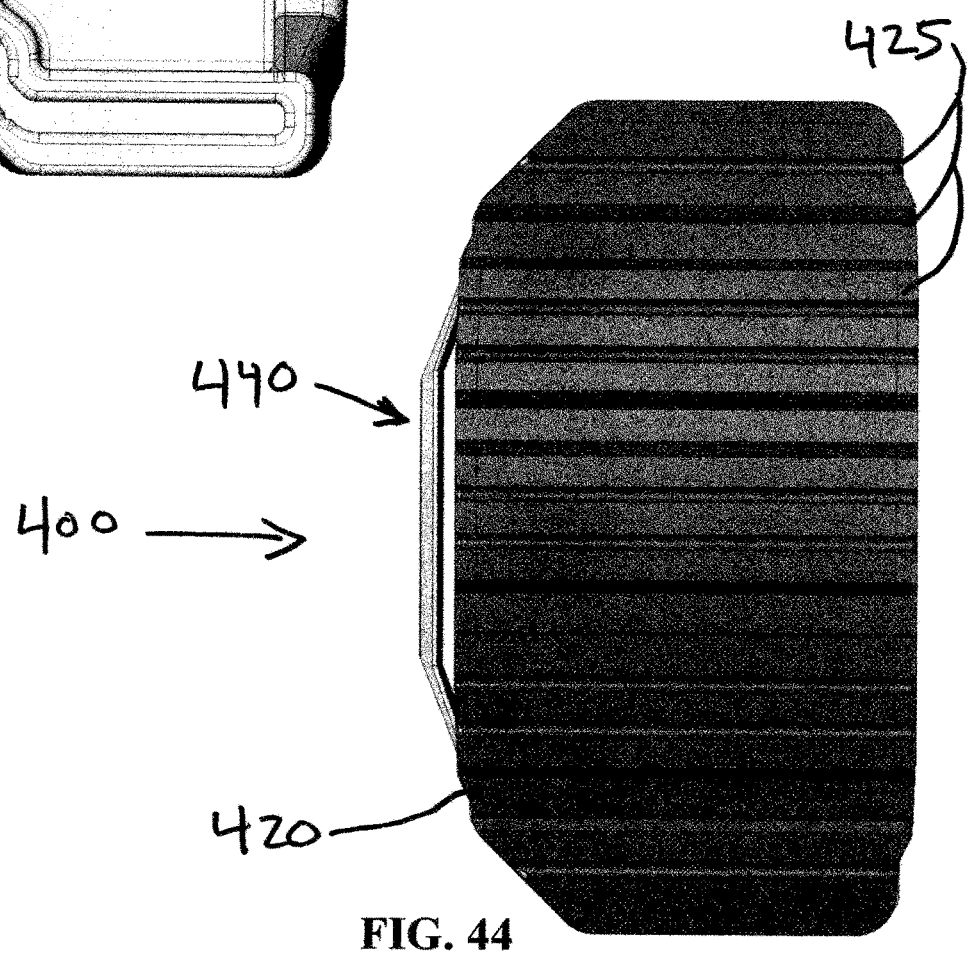
FIG. 44 depicts a shaded bottom plan view of the rail hook of FIG. 25.
Figure 45:
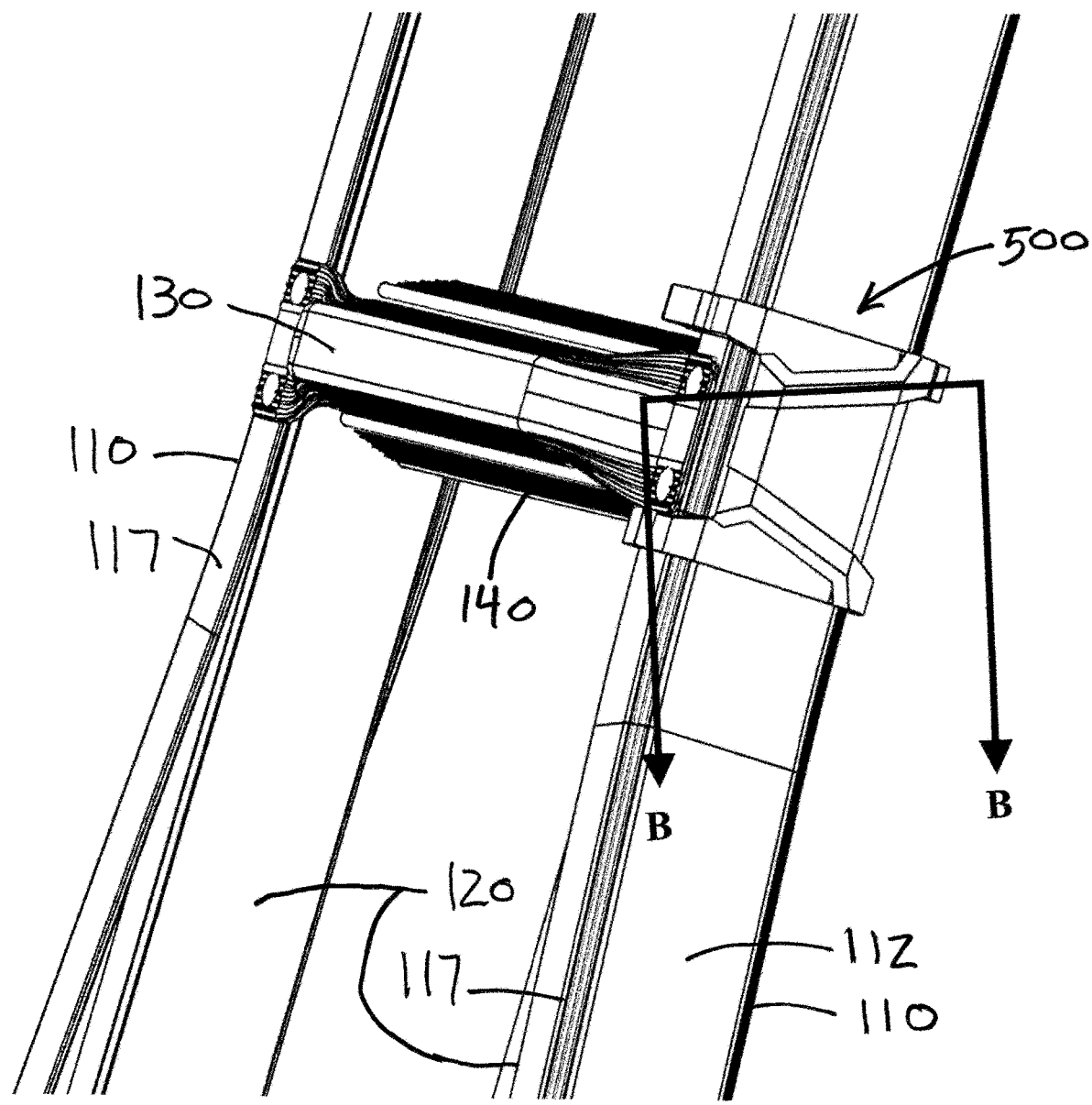
FIG. 45 depicts a close-up perspective view of the multi-position ladder of FIG. 3 providing more detail of a ladder side hook embodiment.
Figure 46:
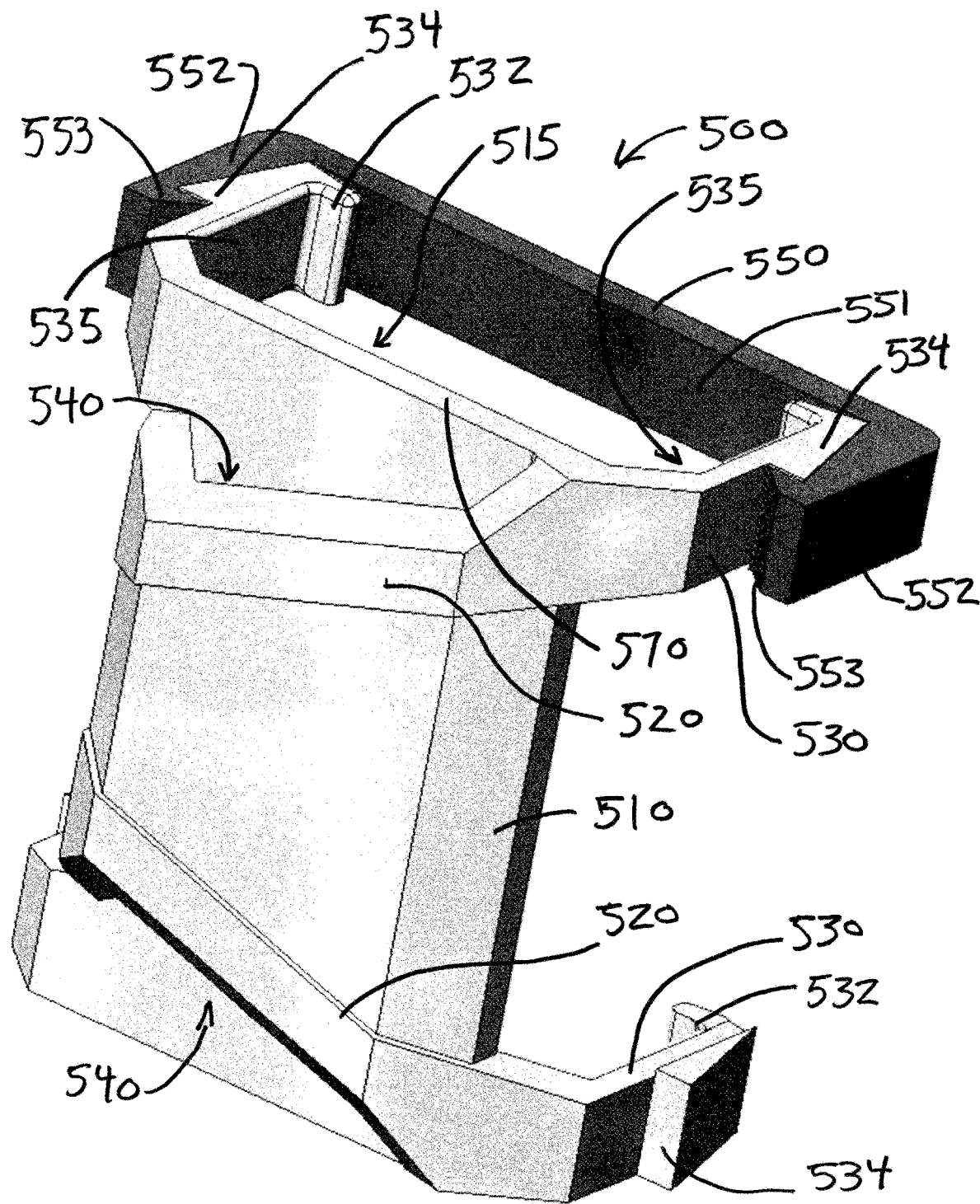
FIG. 46 depicts a shaded perspective view of the ladder side hook of FIG. 45.
Figure 47:
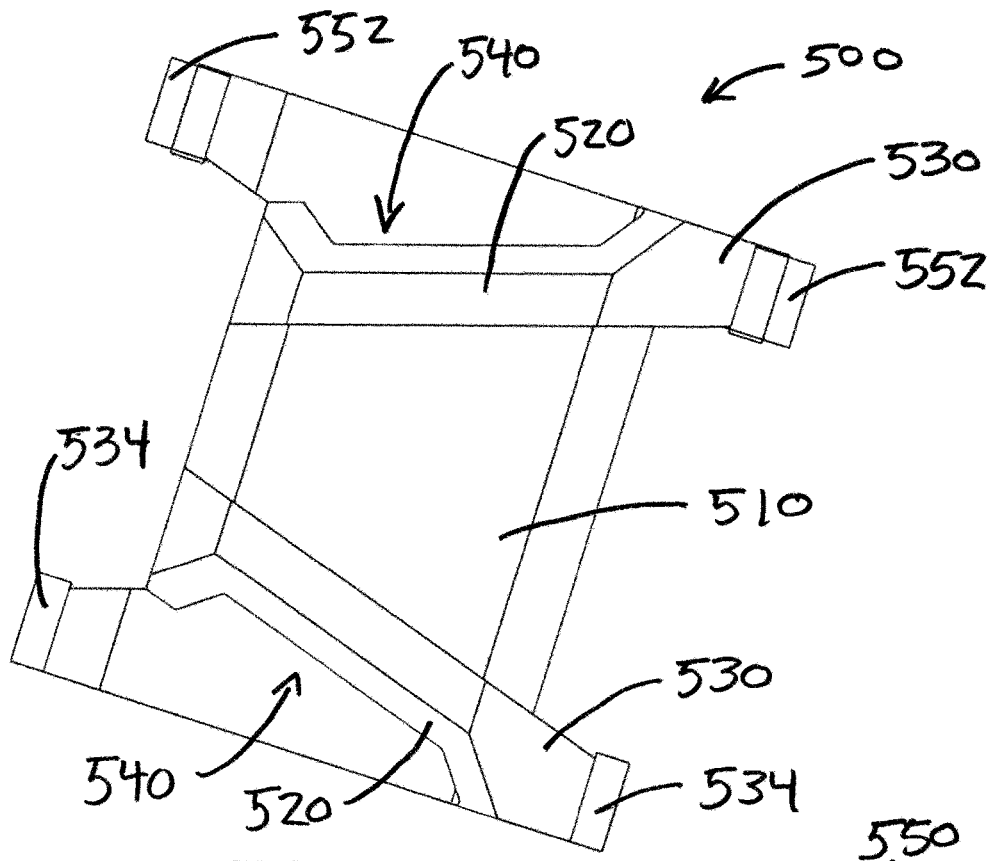
FIG. 47 depicts a front elevation view of the ladder side hook of FIG. 45.
Figure 48:
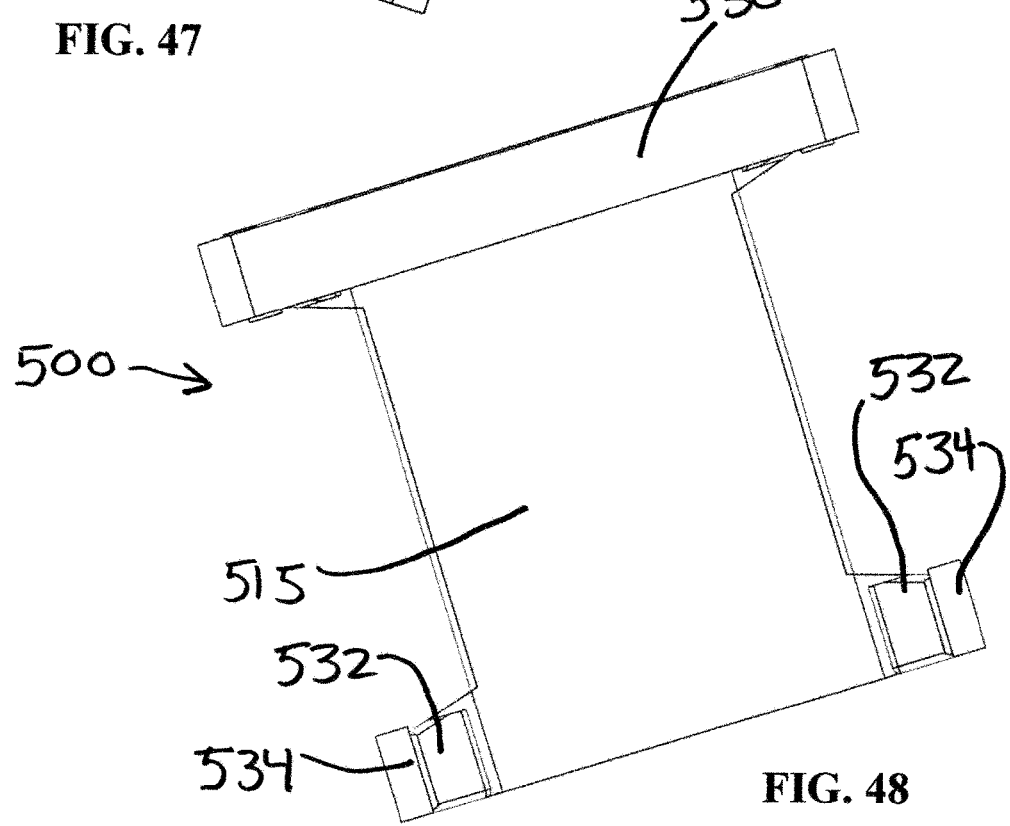
FIG. 48 depicts a rear elevation view of the ladder side hook of FIG. 45.
Figure 49:
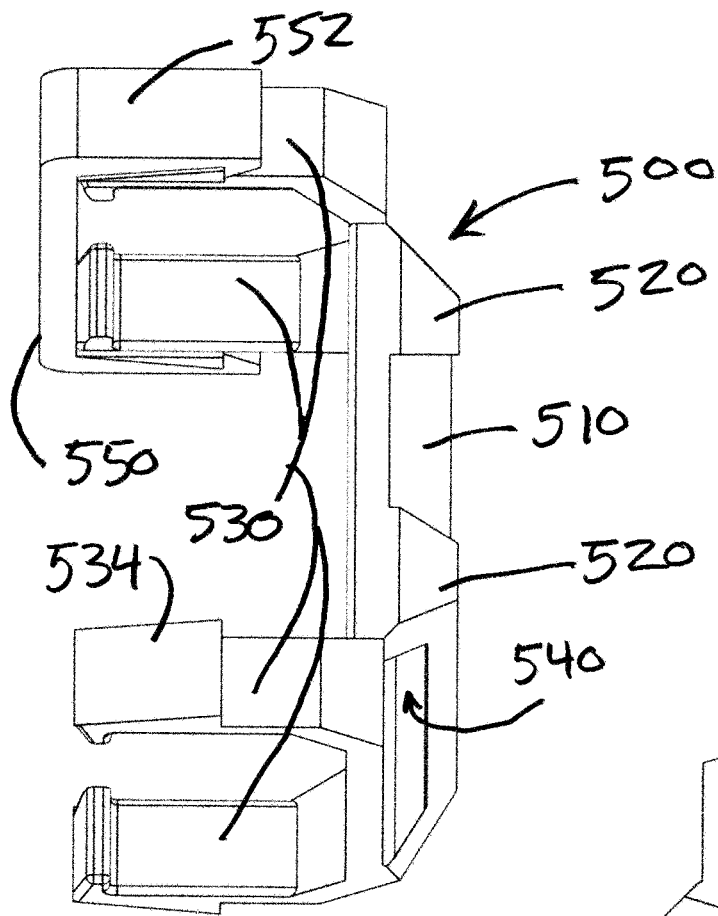
FIG. 49 depicts a right-side view of the ladder side hook of FIG. 45.
Figure 50:
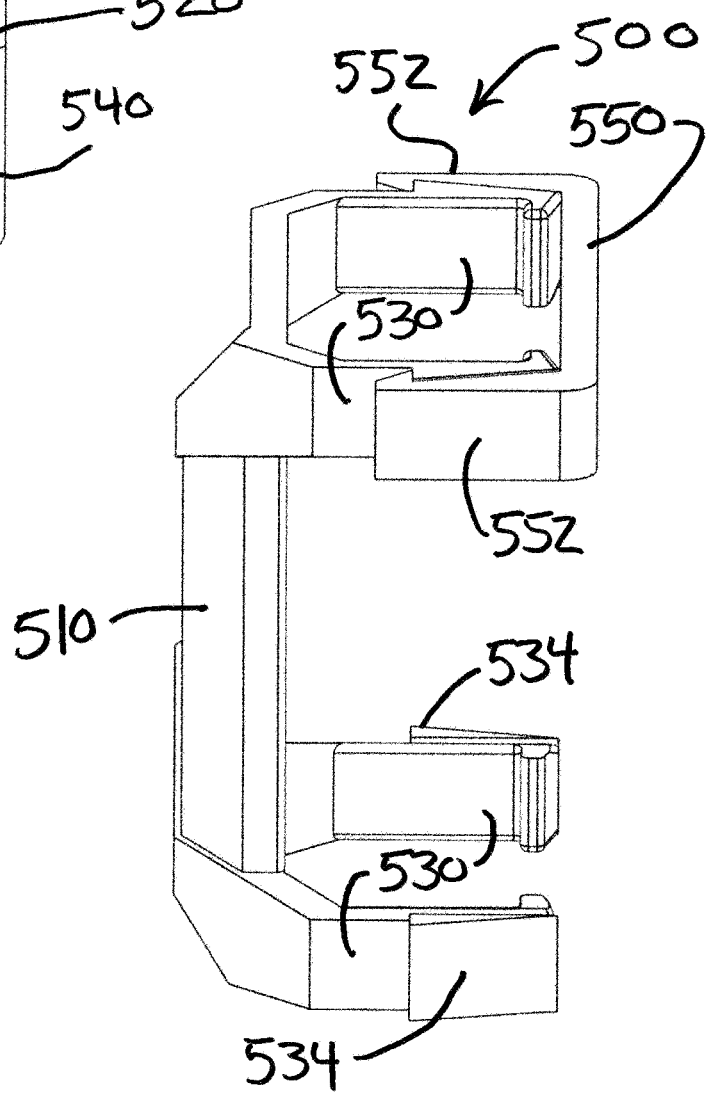
FIG. 50 depicts a left-side view of the ladder side hook of FIG. 45.
Figure 51:
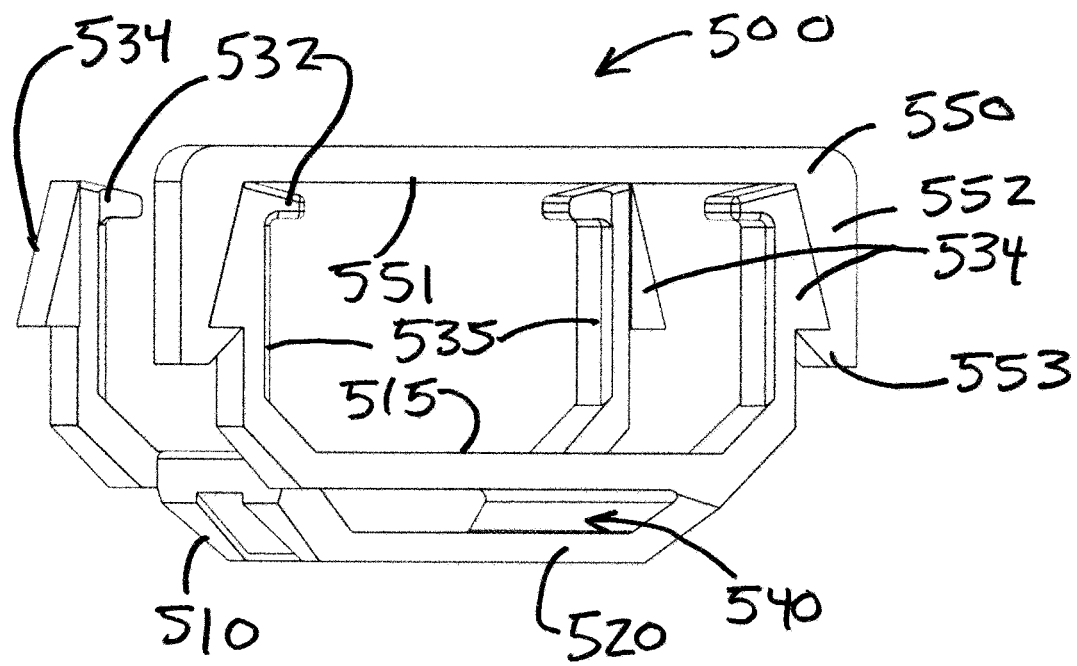
FIG. 51 depicts a top plan view of the ladder side hook of FIG. 45.
Figure 52:
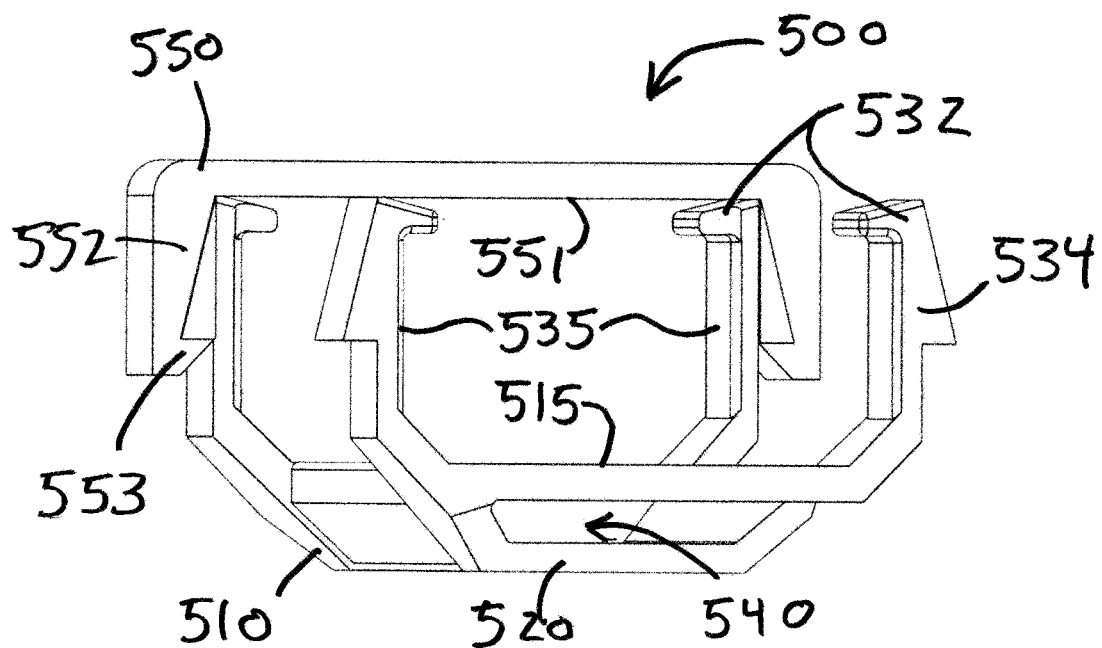
FIG. 52 depicts a bottom plan view of the ladder side hook of FIG. 45.
Figure 53:
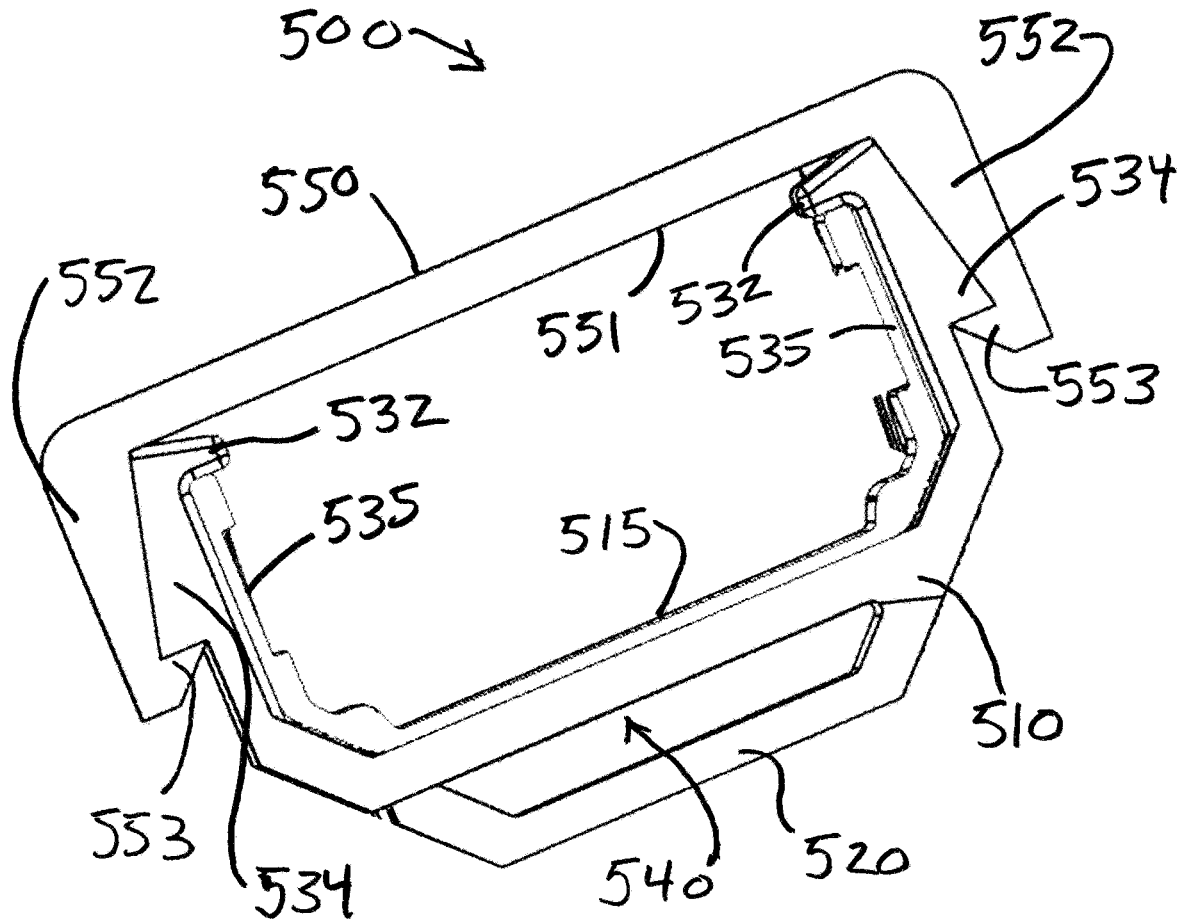
FIG. 53 depicts a cross-sectional view taken along the line B-B in FIG. 45.
Figure 54:
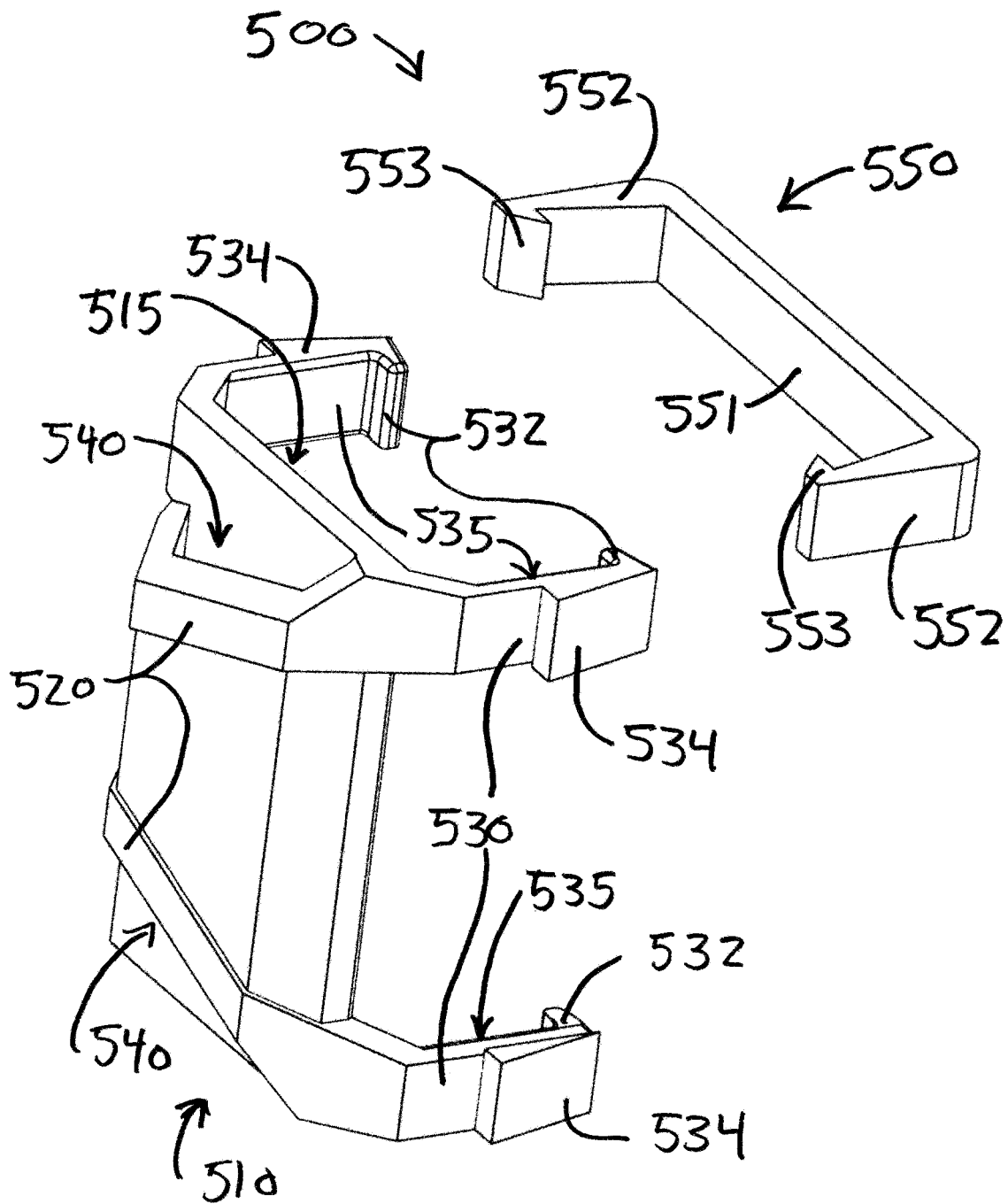
FIG. 54 depicts an exploded perspective view of the ladder side hook of FIG. 45.

Because the purpose of the button hook is for storage or holding tools, materials, or other items is a working environment, it is important that the button hook 200 is sized to be easy to use and access but not cause unintentional catching of people or equipment when moving around the ladder 100 or moving the ladder 100 itself. Therefore, another preferable feature of the button hook 200 is that the hanger 210 is sized to fit within the profiles of the button cap 220. As illustrated in FIGS. 9 & 10, the hanger depth 214 is less than or equal to the button cap depth 224. Likewise, the hanger width 212 is less than or equal to the button cap width 222. This arrangement also eliminates interference with operation of the multi-position ladder 100.

Another embodiment of the invention is a multi-position ladder hinge slotted button 300 as illustrated in detail in FIGS. 16-24. The slotted button 300 provides the same basic functionality of a standard hinge lock button (i.e., releasing the ladder hinge lock 160 to allow hinge 150 to rotate), but provides a means of hanging tools, buckets, or materials for access while on the ladder 100. The ladder hinge slotted button 300 is preferably comprised of just two elements: a button base 310 and a button cap 320 that snap together to function to release the ladder hinge lock 160 and provide a storage orifice 330 in which tools or materials may be stored and allow access while a user is on the multi-position ladder 100.

The button cap 320 of this embodiment is designed to snap fit onto the button base 310 at the end of the center lock pin (not shown) of a multi-position ladder hinge 160. The button cap 320 includes button cap prongs 327 that mate with respective button base prong receivers 315 to lock the cap 320 to the base 310. The prongs 327 include button cap prong tabs 328 to secure the cap 320 to the base 310. The button cap 320 may also have button cap protrusion receivers 322 that mate with button base protrusions 312 to further lock the cap 320 to the base 310. The combination of prong 327/prong receivers 315 and protrusions 312/protrusion receivers 322 provide locking of the cap 320 to the base 310 in both directions and aid strength and rigidity to the slotted button 300. The button cap 320 further includes a button cap channel 312 that runs the length of the cap 310 and functions with the front face 313 of the base 310 to form the storage orifice 330. Preferably, the button cap 320 also include button cap ramps 325 that are aligned with button base grips 317. The ramps 325 and grips 317 function to provide a comfortable grip for a user to grasp and activate the slotted button 300 to unlock or lock the ladder hinges 150. Because the button cap 320 is exposed and snap fits to the button base 310, it is preferably manufactured by injection molding PVC plastic to allow some flexibility.

The button base 310 includes a base central lock pin orifice 340 through which the central lock pin of the hinge (not shown) extends to attach the slotted button to the hinge lock 160. The button base 310 also includes protrusion 312 that align with respective button cap protrusion receivers 322 to provide additional strength to the slotted button 300 and prevent rotation between the cap 320 and base 310. Prong receivers 315 on the button base 310 receive respective button cap prongs 327 to secure the cap 320 to the base 310. The combination of protrusions 312 with protrusion receivers 322 relieves torsional stress on the button call prongs 327. Preferably the anti-rotation protrusion 235 is square or rectangular in shape to maximize prevention of rotation. The button base also includes a base inset 232 to accommodate the upper portion of the hanger 210 as well as mating projections (not shown) on the button cap 220. The base inset 232 is sized to tightly hold the hanger 210 to limit movement of the hanger 210 within the button base 232. The slotted button base 310 is preferably manufactured of injection molded ABS plastic to provide strength and rigidity.

A further embodiment of the present invention is a ladder foot hook 400 as illustrated in detail in FIGS. 25-44. The foot hook 400, in addition to providing the same purpose as a standard ladder foot 190, also provides a means for hanging tools, equipment, or materials at the ends of the ladder 100 when in the extension ladder configuration. The ladder foot hook 400 is preferably comprised of two parts: The foot body 410 and the foot base 420. The foot body 410 is preferably injection molded polypropylene or ABS plastic for strength and rigidity while the foot base 420 is preferably rubber that is overmolded onto the bottom end of the foot body 410.

The foot body 410 includes a rail channel 430 that is formed to tightly conform to and allow the insertion of the end of a multi-position ladder outer rail 110. To secure the foot body 410 to the ladder outer rail 110, an attachment orifice 450 is provided to rivet or bolt the foot hook 400 to the outer rail 110. The novel aspect of the foot hook 400 is incorporating a hook 440 as part of the foot body 410. As best seen in FIGS. 32 & 34-36, the hook 440 is formed by a combination of an inset 447 in the foot body 410 with a hook beam 447 spanning the inset 447 to form a hook 400 onto which tools, equipment, or materials may be hung when the multi-position ladder 100 is in its extension orientation. Preferably the hook 440 is formed as a unibody part of the foot body 410, but could be a separate part made of acceptable material that is attached to the foot body 410 through any means known in the art. Using this design allows the hook 400 to be recessed into the leg body 410 to allow easy to use and access but not cause unintentional catching of people or equipment when moving around the ladder 100 or moving the ladder 100 itself.

A further embodiment of the present invention is a ladder rail hook 500 as illustrated in detail in FIGS. 45-56. The rail hook 500 provides another means for hanging tools, equipment, or materials along the length of the outer rails 110 of a multi-position ladder 100. The ladder rail hook 500 is preferably comprised of two parts: The rail hook body 510 and the rail hook clamp 550 are preferably injection molded of ABS plastic, nylon, or polypropylene depending on the expected use of the ladder 100 upon which the rail hook 500 will be used.

The rail hook 500 has a body 510 with an inner surface 515 that is intended to rest flush against the ladder outer rail lateral surface 112 for the length of the rail hook body 510. The rail hook body 510 includes at least two, but preferably four arms 530 that are dimension to wrap around the outer rail front surface 117 and outer rail rear surface 118. Securing the rail hook body 510 to the outer rail 110 are rail hook arm tabs 532 at the ends of the arms 530. Preferably there are two arms 530 at the top of the rail hook body 510 and two arms 530 at the bottom of the rail hook body 510. Each arm 530 may also include a catch on the exterior surface of the arm 530 that acts with the rail hook clamp arm 552 and rail hook clamp tab 553 to secure the rail hook 500 to the ladder 100.

The rail hook clamp 550 secures the rail hook body 510 to the ladder outer rail 110. The rail hook clamp 550 has an inner surface 551, which, similar to the rail hook body 510, is intended to rest flush against the ladder inner rail surface 125 (see, FIGS. 1-6). Clamp hook arms 552 wrap around the rail hook arm catch 534 and lock onto the rail hook arm 530 via a clamp tab 553. The preferred embodiment utilizes a single rail hook clamp 550 attached to the upper rail hook arms 530 to properly support objects hung from the rail hook 500. However, the rail hook clamp 550 is not absolutely necessary for the rail hook body 510 to provide the functionality of the full rail hook 500 and using a rail hook clamp 550 with each of the upper and lower rail hook arms 530 provides the most secure attachment of the rail hook 500 to the ladder 100.

Figure 55:
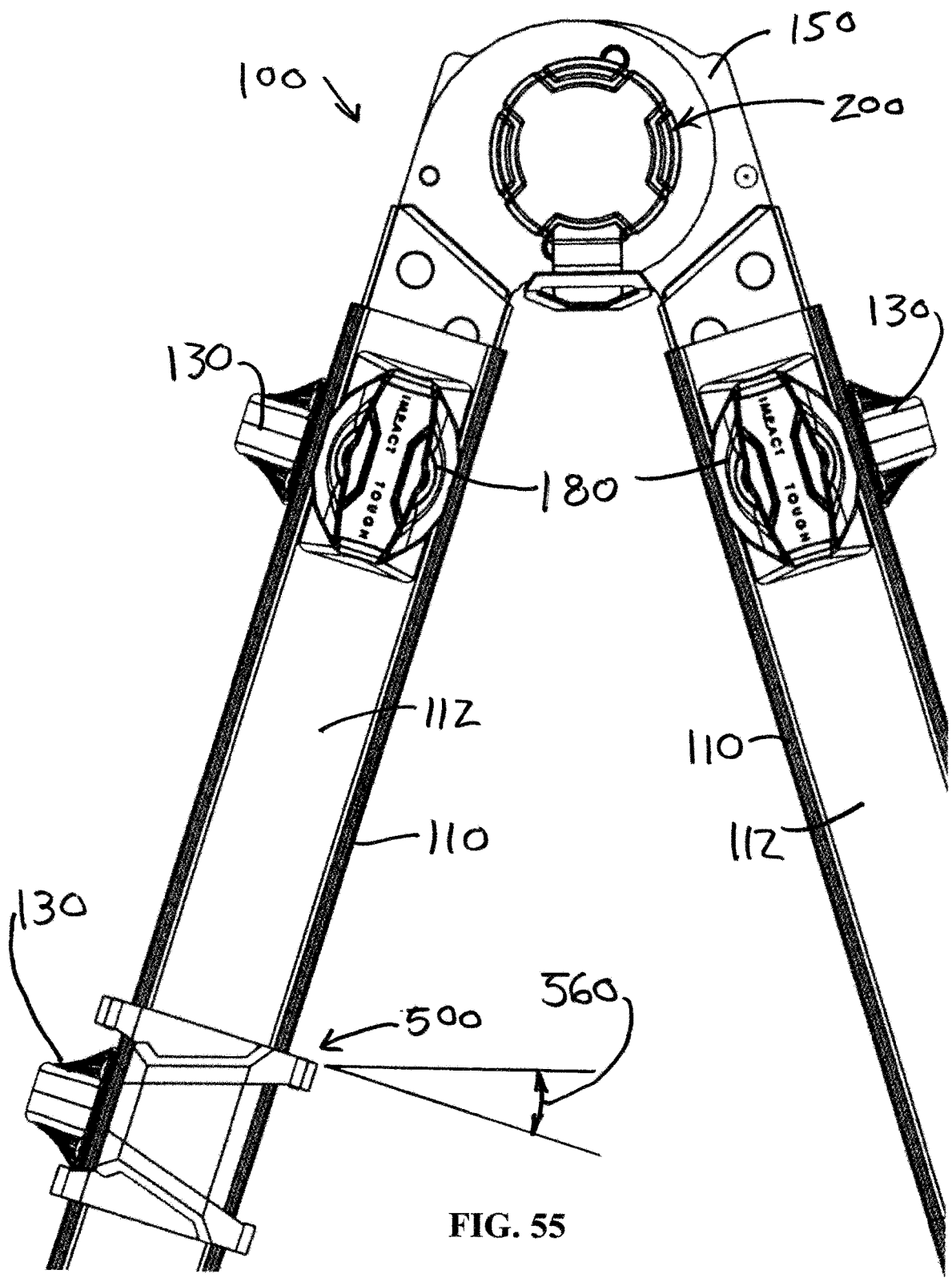
FIG. 55 depicts a close-up right-side elevation view of the multi-position ladder of FIG. 3.
Figure 56:
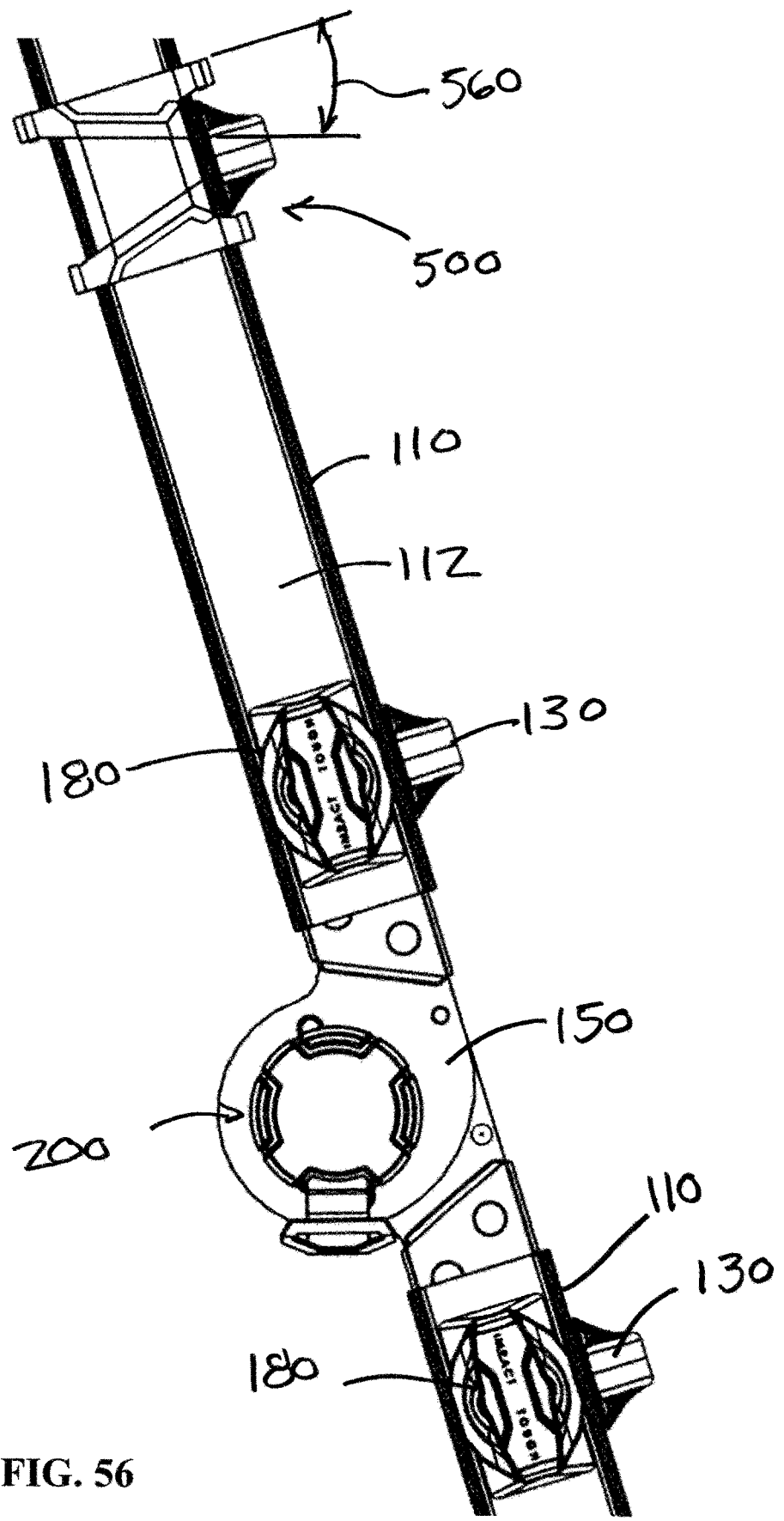
FIG. 56 depicts a close-up left-side elevation view of the multi-position ladder of FIG. 5.

The various parts of the rail hook 500 are dimensioned to allow the rail hook 500 to span an individual outer rail rung 130 of a multi-position ladder 100 (see, FIGS. 55-56). The two sets of rail hook arms 530 being on either side of the outer rail rung 130 prevents the rail hook 530 from sliding in either direction along the ladder outer rail 110 when loaded with a tool, equipment, or materials. However, it is contemplated that the rail hook 500 may be placed anywhere on the outer ladder rail 110 (i.e., both lower and upper rail hook arms 530 may be above a outer rail rung 130 and cannot move down due to the rung 130 interfering the hook arms on the outer rail front face 117.

The rail hook body 510 includes one or more rail hook hangers 520 that form a rail hook storage slot 550 to facilitate handing items from the rail hook 500. Preferably there are two rail hook hangers 520 that allow utilization of the rail hook 500 regardless of the ladder 100 orientation. As with other embodiments the referred embodiment has a narrow storage slot 540 that will accept most tools and various hooks, but not cause unintentional catching of people or equipment when moving around the ladder 100 or moving the ladder 100 itself Another novel aspect of this embodiment is best seen in FIGS. 55-56. The rail hook hanger 520 and rail hook top surface 570 form a rail hook hanger angle 560 that results in the rail hook hanger 520 being parallel to the surface upon which the multi-position ladder 100 rests in either A-frame orientation (FIG. 55) or in extension orientation (FIG. 56). This allows the rail hook hanger 520 to be in the optimal orientation for maintaining any items hung from it. However, v Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. A multi-position ladder comprising:
   two pairs of inner rails, each pair of inner rails connected by a plurality of inner rail rungs and the two pairs of inner rails connected by a pair of hinges, each hinge comprising a hinge lock and hinge button;
   two pair of outer rails, each pair of outer rails connected by a plurality of outer rail rungs and each pair of outer rails slidable with a respective pair of inner rails and defining a combined rail depth;
   each hinge button comprising:
     a hinge button base comprising an inset;
     a hinge button cap comprising a hanger orifice; and
     a hinge button hanger;

wherein the hanger is sandwiched between the hinge button base and the hinge button cap and traverses the hinge button cap hanger orifice.

2. The multi-position ladder of claim 1 further comprising a hanger thickness wherein the hinge button hanger thickness rests inside the hinge button base inset.

3. The multi-position ladder of claim 2 further comprising:
 a hinge button base anti-rotation protrusion;
 a hinge button hanger anti-rotation orifice;
 wherein the anti-rotation protrusion passes through the anti-rotation orifice.

4. The multi-position ladder of claim 3 wherein the hinge button base is comprised of injection molded ABS plastic and the hinge button cap is comprised of injection molded PVC plastic.

5. The multi-position ladder of claim 4 wherein the hinge button hanger is comprised of steel.

\* \* \* \* \*